(12) United States Patent
Clark

(10) Patent No.: US 10,578,950 B2
(45) Date of Patent: *Mar. 3, 2020

(54) PHOTOGRAPHIC LIGHTING SYSTEM AND METHOD

(71) Applicant: Lab Partners Associates, Inc., South Burlington, VT (US)

(72) Inventor: James E. Clark, South Burlington, VT (US)

(73) Assignee: Lab Partners Associates, Inc., South Burlington, VT (US)

(*) Notice: Subject to any disclaimer, the term of this patent is extended or adjusted under 35 U.S.C. 154(b) by 0 days.

This patent is subject to a terminal disclaimer.

(21) Appl. No.: 16/221,934

(22) Filed: Dec. 17, 2018

(65) Prior Publication Data

US 2019/0121218 A1    Apr. 25, 2019

Related U.S. Application Data

(63) Continuation of application No. 15/633,216, filed on Jun. 26, 2017, now Pat. No. 10,156,774, which is a
(Continued)

(51) Int. Cl.
*G03B 15/05* (2006.01)
*H05B 37/00* (2006.01)
(Continued)

(52) U.S. Cl.
CPC ........... *G03B 15/05* (2013.01); *H04N 5/2354* (2013.01); *H05B 33/0845* (2013.01);
(Continued)

(58) Field of Classification Search
None
See application file for complete search history.

(56) References Cited

U.S. PATENT DOCUMENTS 3,039,375 A     6/1962  Umbach
3,116,671 A  *  1/1964  Schankler .............. H05B 41/32
                                                 315/100
(Continued)

FOREIGN PATENT DOCUMENTS

EP         0984320 A1    3/2000
JP         56-143422     11/1981
(Continued)

OTHER PUBLICATIONS

Affadavit of James E. Clark: FlashWizard II Synchronizer, signed Mar. 20, 2008; previously submitted in U.S. Appl. No. 11/697,241.
(Continued)

*Primary Examiner* — William B Perkey
(74) *Attorney, Agent, or Firm* — Birch Tree IP Law & Strategy PLLC; Jamie T. Gallagher

(57) ABSTRACT

Photographic lighting devices, systems, and methods having a plurality of electrical energy storage/discharge (EESD) elements and/or one or more light sources in a single photographic lighting device to perform one or more photographic lighting effects. EESD elements and one or more light sources can be configured to have multiple separate light emissions occur in a single image acquisition window. The multiple light emissions are separated in an image acquisition window by a time period that is about shutter speed exposure time/(N−1), where N is the number of light emissions. In one such example, two light emissions are separated by a time period that is about shutter speed exposure time/(N−1).

24 Claims, 14 Drawing Sheets

Related U.S. Application Data continuation of application No. 14/533,067, filed on Nov. 4, 2014, now Pat. No. 9,690,169.

(60) Provisional application No. 61/899,870, filed on Nov. 4, 2013.

(51) Int. Cl.
*H05B 41/14* (2006.01)
*H05B 33/08* (2006.01)
*H05B 41/38* (2006.01)
*H04N 5/235* (2006.01)
*H05B 37/02* (2006.01)

(52) U.S. Cl.
CPC ......... *H05B 37/00* (2013.01); *H05B 37/0272* (2013.01); *H05B 41/14* (2013.01); *H05B 41/38* (2013.01); *G03B 2215/0571* (2013.01); *G03B 2215/0575* (2013.01); *G03B 2217/007* (2013.01)

(56) References Cited

U.S. PATENT DOCUMENTS

| | | | |
|---|---|---|---|
| 3,185,056 A | 5/1965 | Gold et al. | |
| 3,205,803 A | 9/1965 | Burgarella et al. | |
| 3,259,042 A | 7/1966 | Kagan | |
| RE26,627 E | 7/1969 | Burgarella et al. | |
| 3,547,017 A | 12/1970 | Harvey | |
| 3,659,509 A | 5/1972 | Burgarella | |
| 3,669,861 A * | 6/1972 | Cash, Jr. ................ | C23C 14/35 204/192.34 |
| 3,706,266 A | 12/1972 | Uno et al. | |
| 3,728,947 A | 4/1973 | Harnden et al. | |
| 3,782,258 A | 1/1974 | Boekkooi et al. | |
| 3,810,214 A | 5/1974 | Malone et al. | |
| 4,047,191 A | 9/1977 | Coppa et al. | |
| 4,067,030 A | 1/1978 | Kuramoto et al. | |
| 4,194,818 A | 3/1980 | Matteson et al. | |
| 4,201,434 A | 5/1980 | Tureck | |
| 4,209,244 A | 6/1980 | Sahara et al. | |
| 4,329,624 A | 5/1982 | Kamon et al. | |
| 4,333,719 A | 6/1982 | Takami et al. | |
| 4,344,680 A | 8/1982 | Ishida et al. | |
| 4,351,594 A | 9/1982 | Ishida et al. | |
| 4,355,309 A | 10/1982 | Hughey et al. | |
| 4,368,966 A | 1/1983 | Hagyuda | |
| 4,410,250 A | 10/1983 | Curran | |
| 4,465,353 A | 8/1984 | Yoshida et al. | |
| 4,482,895 A | 11/1984 | Weinberg | |
| 4,509,845 A | 4/1985 | Mizokami | |
| 4,552,443 A * | 11/1985 | Broida .................... | G03B 7/16 396/182 |
| 4,571,049 A | 2/1986 | Tsunefuji et al. | |
| 4,573,786 A | 3/1986 | Taniguchi et al. | |
| 4,603,954 A | 8/1986 | Egawa et al. | |
| 4,608,522 A * | 8/1986 | Yuasa .................... | H05B 41/34 315/151 |
| 4,636,052 A | 1/1987 | Bowsher | |
| 4,643,551 A | 2/1987 | Ohmori | |
| 4,693,582 A | 9/1987 | Kawamura et al. | |
| 4,705,373 A | 11/1987 | Ohmori | |
| 4,707,127 A | 11/1987 | Goedken | |
| 4,712,902 A | 12/1987 | Hosomizu et al. | |
| 4,740,804 A | 4/1988 | Shands | |
| 4,771,301 A * | 9/1988 | Yamada .................. | G03B 15/05 315/151 |
| 4,816,850 A | 3/1989 | Phillipeaux et al. | |
| 4,816,855 A | 3/1989 | Kitaura et al. | |
| 4,881,013 A | 11/1989 | Kataoka et al. | |
| 4,884,094 A | 11/1989 | Kitaura et al. | |
| 4,988,584 A | 1/1991 | Shaper | |
| 5,016,037 A | 5/1991 | Taniguchi et al. | |
| 5,034,769 A | 7/1991 | Takami et al. | |
| 5,159,375 A | 10/1992 | Taniguchi et al. | |
| 5,218,397 A | 6/1993 | Takagi | |
| 5,283,610 A | 2/1994 | Sasaki | |
| 5,285,232 A | 2/1994 | Taniguchi et al. | |
| 5,299,012 A | 3/1994 | Tsuruta et al. | |
| 5,359,375 A | 10/1994 | Clark | |
| 5,384,611 A | 1/1995 | Tsuji et al. | |
| 5,422,543 A | 6/1995 | Weinberg | |
| 5,436,531 A | 7/1995 | Weinberg | |
| 5,521,708 A | 5/1996 | Beretta | |
| 5,640,623 A | 6/1997 | Sasaki | |
| 5,692,223 A | 11/1997 | Ichikawa et al. | |
| 5,708,833 A | 1/1998 | Kinney et al. | |
| 5,713,050 A | 1/1998 | Ozawa | |
| 5,721,971 A | 2/1998 | Sasaki | |
| 5,724,620 A * | 3/1998 | Hagiuda ................ | G03B 15/05 396/171 |
| 5,734,934 A | 3/1998 | Horinishi et al. | |
| 5,752,103 A * | 5/1998 | Nishida ................... | G03B 9/70 396/173 |
| 5,754,898 A | 5/1998 | Nakano | |
| 5,835,794 A | 11/1998 | Lo et al. | |
| 5,848,306 A | 12/1998 | Shono | |
| 6,006,039 A | 12/1999 | Steinberg et al. | |
| 6,029,013 A | 2/2000 | Larkin et al. | |
| 6,052,539 A | 4/2000 | Latorre | |
| 6,088,542 A | 7/2000 | Yanai et al. | |
| 6,127,940 A | 10/2000 | Weinberg | |
| 6,167,199 A | 12/2000 | Fukui | |
| 6,188,431 B1 | 2/2001 | Oie | |
| 6,259,862 B1 | 7/2001 | Marino et al. | |
| 6,278,481 B1 | 8/2001 | Schmidt | |
| 6,351,610 B1 | 2/2002 | Numako et al. | |
| 6,353,711 B1 | 3/2002 | Numako et al. | |
| 6,366,737 B1 | 4/2002 | Numako et al. | |
| 6,400,907 B1 | 6/2002 | Izukawa | |
| 6,404,987 B1 * | 6/2002 | Fukui ...................... | G03B 7/16 396/56 |
| 6,430,369 B2 | 8/2002 | Lee et al. | |
| 6,453,154 B1 | 9/2002 | Haber et al. | |
| 6,524,237 B1 | 2/2003 | McGowan | |
| 6,618,557 B1 | 9/2003 | Ziemkowski | |
| 6,625,399 B1 | 9/2003 | Davis | |
| 6,683,654 B1 | 1/2004 | Haijima | |
| 6,718,135 B2 | 4/2004 | Kawasaki et al. | |
| 6,731,952 B2 | 5/2004 | Schaeffer et al. | |
| 6,748,165 B2 | 6/2004 | Ogasawara | |
| 6,778,764 B2 | 8/2004 | Barghini et al. | |
| 6,798,986 B2 | 9/2004 | Hagiuda | |
| 6,863,417 B2 | 3/2005 | Hill | |
| 6,941,067 B2 | 9/2005 | Muramatsu | |
| 7,016,603 B2 | 3/2006 | Clark | |
| 7,035,534 B2 | 4/2006 | Shih et al. | |
| 7,133,607 B2 | 11/2006 | Clark | |
| 7,136,709 B2 | 11/2006 | Arling et al. | |
| 7,184,658 B2 | 2/2007 | Squillace | |
| 7,362,965 B2 | 4/2008 | Clark | |
| 7,437,063 B2 | 10/2008 | Clark | |
| 7,446,800 B2 | 11/2008 | Holmes | |
| 7,463,304 B2 | 12/2008 | Murray | |
| 7,502,067 B2 * | 3/2009 | Kakinuma ............. | H04N 5/235 348/218.1 |
| 7,684,692 B2 | 3/2010 | Kashiyama | |
| 7,702,228 B2 | 4/2010 | Clark | |
| 7,714,908 B2 | 5/2010 | Holmes | |
| 7,764,875 B2 | 7/2010 | Clark | |
| 7,775,575 B2 | 8/2010 | Clark | |
| 7,783,188 B2 | 8/2010 | Clark | |
| 7,834,894 B2 | 11/2010 | Swanson et al. | |
| 7,877,005 B2 | 1/2011 | Okubo | |
| 7,880,761 B2 | 2/2011 | Clark | |
| 7,885,533 B2 | 2/2011 | Clark | |
| 7,965,335 B2 | 6/2011 | Niblock | |
| 7,969,504 B2 | 6/2011 | Matsuda et al. | |
| 7,970,267 B1 | 6/2011 | Clark | |
| 8,116,620 B2 | 2/2012 | King | |
| 8,116,621 B2 | 2/2012 | King | |
| 8,121,468 B2 | 2/2012 | Clark | |
| 8,130,276 B2 | 3/2012 | Holmes | |

(56) References Cited

U.S. PATENT DOCUMENTS

| | | |
|---|---|---|
| 8,134,576 B2 | 3/2012 | Swanson et al. |
| 8,180,210 B2 | 5/2012 | Clark |
| 8,326,136 B1 * | 12/2012 | Clark ............... G03B 15/02 396/164 |
| 8,326,140 B2 | 12/2012 | Clark |
| 8,326,141 B1 | 12/2012 | Clark |
| 8,331,776 B2 | 12/2012 | Clark |
| 8,351,774 B2 | 1/2013 | Clark |
| 8,526,808 B2 | 9/2013 | Clark |
| 8,532,476 B2 | 9/2013 | Clark |
| 8,538,250 B2 | 9/2013 | Clark |
| 8,559,804 B1 | 10/2013 | Clark |
| 8,571,401 B2 | 10/2013 | Clark |
| 8,571,406 B2 | 10/2013 | Clark |
| 8,600,224 B2 | 12/2013 | Clark |
| 8,614,766 B1 | 12/2013 | Clark |
| 8,705,950 B2 | 4/2014 | Clark |
| 8,718,461 B2 | 5/2014 | Clark |
| 8,803,989 B2 | 8/2014 | Clark |
| 8,824,881 B2 | 9/2014 | Li et al. |
| 8,824,882 B2 | 9/2014 | Clark |
| 8,917,350 B2 | 12/2014 | Clark |
| 8,953,094 B2 | 2/2015 | Baer |
| 9,250,499 B2 | 2/2016 | Clark |
| 9,354,491 B2 | 5/2016 | Clark |
| 9,420,157 B2 | 8/2016 | Clark |
| 9,602,707 B2 | 3/2017 | Clark |
| 9,635,233 B2 | 4/2017 | Clark |
| 9,690,169 B2 * | 6/2017 | Clark ............... G03B 15/05 |
| 9,918,000 B2 | 3/2018 | Clark |
| 10,156,774 B2 * | 12/2018 | Clark ............... G03B 15/05 |
| 2001/0042149 A1 | 11/2001 | Ito et al. |
| 2002/0009296 A1 | 1/2002 | Shaper et al. |
| 2002/0013161 A1 | 1/2002 | Schaeffer et al. |
| 2002/0061192 A1 | 5/2002 | Kawasaki et al. |
| 2002/0067425 A1 | 6/2002 | Iverson |
| 2002/0067923 A1 | 6/2002 | Fujimura |
| 2002/0127019 A1 | 9/2002 | Ogasawara |
| 2002/0191389 A1 | 12/2002 | Hill |
| 2003/0095799 A1 * | 5/2003 | Kudo ............... G03B 7/091 396/173 |
| 2003/0128272 A1 | 7/2003 | Clough et al. |
| 2003/0133018 A1 * | 7/2003 | Ziemkowski ........ H04N 5/2256 348/211.2 |
| 2003/0161621 A1 | 8/2003 | Takaiwa |
| 2003/0165335 A1 | 9/2003 | Hagiuda |
| 2003/0193588 A1 | 10/2003 | Yuen et al. |
| 2004/0036774 A1 | 2/2004 | Nichols et al. |
| 2004/0066455 A1 | 4/2004 | Holmes |
| 2004/0101295 A1 * | 5/2004 | Clark ............... G03B 9/70 396/56 |
| 2004/0136702 A1 | 7/2004 | Barghini et al. |
| 2004/0145114 A1 | 7/2004 | Ippolito et al. |
| 2004/0234259 A1 | 11/2004 | Muramatsu |
| 2005/0006484 A1 | 1/2005 | Ito |
| 2005/0096753 A1 | 5/2005 | Arling et al. |
| 2005/0174434 A1 | 8/2005 | Chang et al. |
| 2005/0249486 A1 | 11/2005 | Murray |
| 2005/0281549 A1 | 12/2005 | Shih et al. |
| 2006/0014563 A1 | 1/2006 | Cheng |
| 2006/0093341 A1 | 5/2006 | Clark |
| 2006/0093348 A1 | 5/2006 | Squillace |
| 2006/0216009 A1 | 9/2006 | Kawamura |
| 2006/0257130 A1 | 11/2006 | Lee et al. |
| 2006/0275024 A1 | 12/2006 | McNary |
| 2006/0291016 A1 | 12/2006 | Ishigami et al. |
| 2007/0014553 A1 | 1/2007 | Endo |
| 2007/0058959 A1 | 3/2007 | Clark |
| 2007/0070206 A1 | 3/2007 | Clark |
| 2007/0110416 A1 | 5/2007 | Yamaguchi et al. |
| 2007/0160358 A1 | 7/2007 | Kashiyama |
| 2007/0229250 A1 | 10/2007 | Recker et al. |
| 2007/0237510 A1 * | 10/2007 | Clark ............... G03B 15/02 396/56 |
| 2007/0273774 A1 | 11/2007 | Holmes |
| 2008/0106630 A1 | 5/2008 | Matsuda et al. |
| 2008/0180531 A1 | 7/2008 | Sekiguchi |
| 2008/0193114 A1 | 8/2008 | Clark |
| 2008/0246777 A1 | 10/2008 | Swanson et al. |
| 2008/0298792 A1 | 12/2008 | Clark |
| 2008/0298793 A1 | 12/2008 | Clark |
| 2009/0034952 A1 | 2/2009 | Clark |
| 2009/0060488 A1 | 3/2009 | Okubo |
| 2009/0066810 A1 | 3/2009 | Holmes |
| 2009/0097835 A1 | 4/2009 | Kunishige et al. |
| 2009/0102679 A1 | 4/2009 | Schoettle |
| 2009/0129765 A1 | 5/2009 | King |
| 2009/0135262 A1 | 5/2009 | Ogasawara |
| 2009/0185797 A1 | 7/2009 | Ogasawara |
| 2009/0278479 A1 | 11/2009 | Platner et al. |
| 2009/0310012 A1 | 12/2009 | Ueda et al. |
| 2010/0008658 A1 | 1/2010 | King |
| 2010/0118177 A1 | 5/2010 | Niblock |
| 2010/0122215 A1 | 5/2010 | MacGregor |
| 2010/0124412 A1 | 5/2010 | King |
| 2010/0158494 A1 * | 6/2010 | King ............... G03B 17/00 396/56 |
| 2010/0177212 A1 | 7/2010 | Holmes |
| 2010/0202767 A1 | 8/2010 | Shirakawa |
| 2010/0209089 A1 | 8/2010 | King |
| 2010/0290771 A1 | 11/2010 | Clark |
| 2010/0316364 A1 | 12/2010 | Clark |
| 2011/0001665 A1 | 1/2011 | King |
| 2011/0119409 A1 * | 5/2011 | King ............... H04N 5/23203 710/14 |
| 2011/0123185 A1 | 5/2011 | Clark |
| 2011/0128390 A1 | 6/2011 | Clark |
| 2011/0129207 A1 | 6/2011 | King et al. |
| 2011/0134141 A1 | 6/2011 | Swanson et al. |
| 2011/0167008 A1 | 7/2011 | King |
| 2011/0268432 A1 | 11/2011 | Clark |
| 2012/0027395 A1 | 2/2012 | Clark |
| 2012/0033959 A1 | 2/2012 | King |
| 2012/0044371 A1 | 2/2012 | King |
| 2012/0045193 A1 | 2/2012 | King |
| 2012/0051726 A1 | 3/2012 | King |
| 2012/0099847 A1 | 4/2012 | Clark |
| 2012/0120281 A1 | 5/2012 | Swanson et al. |
| 2012/0127340 A1 | 5/2012 | Holmes |
| 2012/0127361 A1 | 5/2012 | Clark |
| 2012/0140088 A1 | 6/2012 | Clark |
| 2012/0148221 A1 | 6/2012 | Clark |
| 2012/0181948 A1 | 7/2012 | Clark |
| 2012/0194688 A1 | 8/2012 | Li et al. |
| 2012/0194699 A1 | 8/2012 | Kouno |
| 2012/0207459 A1 | 8/2012 | Clark |
| 2012/0207460 A1 | 8/2012 | Clark |
| 2012/0230663 A1 | 9/2012 | Ogasawara |
| 2012/0243859 A1 | 9/2012 | Clark |
| 2013/0069559 A1 | 3/2013 | Li et al. |
| 2013/0089313 A1 | 4/2013 | Clark |
| 2013/0094845 A1 | 4/2013 | Clark |
| 2013/0100340 A1 | 4/2013 | Clark |
| 2013/0120636 A1 | 5/2013 | Baer |
| 2013/0121674 A1 | 5/2013 | Clark |
| 2013/0230305 A1 | 9/2013 | Falk et al. |
| 2013/0343742 A1 | 12/2013 | Clark |
| 2014/0217884 A1 | 8/2014 | Falk et al. |
| 2014/0241710 A1 | 8/2014 | Clark |
| 2014/0347508 A1 | 11/2014 | Clark |
| 2014/0369673 A1 | 12/2014 | Clark |
| 2015/0124427 A1 | 5/2015 | Clark |
| 2015/0245453 A1 | 8/2015 | Falk et al. |
| 2015/0373818 A1 | 12/2015 | Otterberg |
| 2016/0119524 A1 | 4/2016 | Clark |
| 2016/0198078 A1 | 7/2016 | Falk |
| 2016/0219201 A1 | 7/2016 | Falk |
| 2016/0248960 A1 | 8/2016 | Falk |
| 2016/0353002 A1 | 12/2016 | Clark |
| 2017/0201666 A1 | 7/2017 | Clark |
| 2017/0223253 A1 | 8/2017 | Clark |

(56) References Cited

U.S. PATENT DOCUMENTS

| | | |
|---|---|---|
| 2017/0293204 A1 | 10/2017 | Clark |
| 2018/0024418 A1 | 1/2018 | Clark |

FOREIGN PATENT DOCUMENTS

| | | |
|---|---|---|
| JP | 59-064821 A | 4/1984 |
| JP | 59-170822 | 9/1984 |
| JP | 63-018874 | 1/1988 |
| JP | 04-021834 A | 1/1992 |
| JP | 05-093948 | 4/1993 |
| JP | 07-159844 A | 6/1995 |
| JP | 07-159866 | 6/1995 |
| JP | 2002-244193 A | 8/2002 |
| JP | 2002-318413 | 10/2002 |
| JP | 2003-172970 A | 6/2003 |
| JP | 3445447 B2 | 6/2003 |
| JP | 2003-215672 A | 7/2003 |
| JP | 2003-325451 | 11/2003 |
| JP | 2004-072230 | 3/2004 |
| JP | 2005-236532 A | 9/2005 |
| JP | 2006-149935 | 6/2006 |
| JP | 2007-067870 A | 3/2007 |
| KR | 10-0728117 | 6/2007 |
| WO | 1996038925 A1 | 12/1996 |
| WO | 2010093914 A1 | 8/2010 |
| WO | 2016076777 A1 | 5/2016 |

OTHER PUBLICATIONS

Analog Devices Technical Data Sheet for ADF7020-1 Transceiver IC, Analog Devices, Inc., 2005, pp. 1-44.
ASH Transceiver Impedance Matching; Document Created on Dec. 10, 2001; pp. 1 to 10; http://www.rfm.com/products/apnotes/antennamatch.pdf; last viewed on Dec. 15, 2005.
Canon EOS 40D Usuer's Manual; about Sep. 2007; Canon Corporation.
Declaration of James E. Clark filed Feb. 18, 2005 in U.S. Appl. No. 10/306,759.
Ken Rockwell: Nikon SU-800 Remote Commander; Nov. 1, 2005, http://www.kenrockwell.com/nikon/su800.htm; last viewed on Jul. 18, 2012.
Ken Rockwell; How to Use Nikon Strobes Wirelessly, for Free!; Dec. 17, 2005; http://web.archive.org/web/20051217091704/http://www.kenrockwell.com/nikon/ittlslave.htm; last viewed at Internet archive on Apr. 1, 2010.
Nikon D2x; Sep. 2004; pp. 1 to 12; Nikon Corporation.
Nikon D80 User's Manual; see "Modeling Flash," p. 98; published on Aug. 11, 2006.
Nikon SB-900 Speedlight User's Manual. 2008.
Nikon WT-1 Transmitter User's Manual; around Dec. 2003; Nikon Corporation.
Nikon WT-2 Article, Part 1; Nikon Corporation; http://nikonimaging.com/global/technology/scene/11/index.htm; last viewed on Mar. 14, 2008.
Nikon WT-2 Article, Part 2: Nikon Corporation; http://nikonimaging.com/global/technology/scene/11/index_02.htm; last viewed on Mar. 14, 2008.
Phil Askey, Nikon D2H Review: 15. Wireless: Digital Photography Review, Wireless (Review of WT-1 Transmitter); Dec. 2003; http://www.dpreview.com/reviews/NikonD2H/page15.asp; last viewed on Mar. 18, 2008.
Phil Askey, Nikon D2H Review: 1. Introduction: Digital Photography Review, Nikon D2H Review, Dec. 2003; http://www.dpreview.com/reviews/NikonD2H/; last viewed on Mar. 18, 2008.
Phil Askey, Nikon D2Hs Preview: 1. Introduction: Digital Photography Review (includes Review of WT-2 Transmitter); Feb. 2005; http://www.dpreview.com/articles/nikond2hs/; last viewed Mar. 14, 2008.
PocketWizard MultiMAX Transceiver New Trigger Control Software Features, by LPA Design, Feb. 10, 2001; pp. 1 to 6, United States.

PocketWizard MultiMAX Transceiver Owner's Manual, by LPA Design, May 2001, pp. 1-55 and "Relay Mode" on p. 40, United States.
Profoto Pro-B2 User's Manual, dated Jan. 2005.
Quantum FreeWire Transceiver; Jul. 17, 2005; pp. 1 to 7; http://web.archive.org/web/20050717015832/http://www.qtm.com/wireless/freewire.html; last viewed at Internet Archive on Apr. 25, 2008.
Quantum FreeWire Transceiver; Nov. 15, 2004; pp. 1 to 7; http://web.archive.org/web/20041115093657/http://www.qtm.com/wireless/freewire.html; last viewed at Internet Archive on Apr. 25, 2008.
Quantum FreeWire Transceiver; Oct. 7, 2001; pp. 1 to 6; http://web.archive.org/web/20011007140624/http://www.qtm.com/wireless/freewire.html; last viewed at Internet Archive on Apr. 25, 2008.
Robert Hanashiro; Equipment Corner—News & Notes for all Those Gear-Heads; Nov. 26, 2001; pp. 1 to 3; http://www.sportsshooter.com/news_story.html?id=594; last viewed on Septemer, 17, 2002.
XE-200 RF Shutter Release for Rebel 2000; http://zenopuseelectronix.com/XE-200.html; last viewed on Sep. 9, 2002.
Rob Galbraith; Casting Light on the PocketWizard MiniTT1 and FlexTT5; Parts 1 to 5; Feb. 16, 2009.
Strobist Blog: PocketWizard FlexTT5 and MiniTT1: Full Review; Feb. 16 to 18, 2009; blog comments, pp. 1 to 40; http://strobist.blogspot.com/2009/02/pocketwizard-flextt5-and-minitt1-full.html; last viewed on Feb. 18, 2009.
Strobist Blog: PocketWizard FlexTT5 and MiniTT1: Full Review; Feb. 16, 2009; pp. 1 to 11; http://strobist.blogspot.com/2009/02/pocketwizard-flextt5-and-minitt1-full.html; last viewed on Feb. 18, 2009.
Canon 600EX and 600EX-RT Speedlite Instruction Manual; Canon Corporation; Copyright 2012 (product launch at least as early as Mar. 2012).
Canon ST-E3-RT Speedlite Transmitter Instruction Manual; Canon Corporation; Copyright 2012 (product launch at least as early as Mar. 2012).
PocketWizard MiniTT1 and FlexTT5 User Manual, by LPA Design, PDF generated Mar. 23, 2012.
U.S. Appl. No. 10/306,759, Aug. 29, 2003, Office Action, U.S. Pat. No. 7,016,603.
U.S. Appl. No. 10/306,759, Dec. 18, 2003, Response to Office Action, U.S. Pat. No. 7,016,603.
U.S. Appl. No. 10/306,759, Dec. 24, 2003, Examiner Interview Summary, U.S. Pat. No. 7,016,603.
U.S. Appl. No. 10/306,759, Mar. 27, 2004, Final Office Action, U.S. Pat. No. 7,016,603.
U.S. Appl. No. 10/306,759, Apr. 15, 2004, Examiner Interview Summary, U.S. Pat. No. 7,016,603.
U.S. Appl. No. 10/306,759, Apr. 20, 2004, Response to Final Office Action, U.S. Pat. No. 7,016,603.
U.S. Appl. No. 10/306,759, Aug. 24, 2004, Office Action, U.S. Pat. No. 7,016,603.
U.S. Appl. No. 10/306,759, Feb. 18, 2005, Request for Continued Examination, U.S. Pat. No. 7,016,603.
U.S. Appl. No. 10/306,759, Mar. 29, 2005, Office Action, U.S. Pat. No. 7,016,603.
U.S. Appl. No. 10/306,759, Apr. 14, 2005, Response to Office Action, U.S. Pat. No. 7,016,603.
U.S. Appl. No. 10/306,759, Jun. 29, 2005, Final Office Action, U.S. Pat. No. 7,016,603.
U.S. Appl. No. 10/306,759, Aug. 25, 2005, Response to Final Office Action, U.S. Pat. No. 7,016,603.
U.S. Appl. No. 10/306,759, Sep. 16, 2005, Notice of Allowance, U.S. Pat. No. 7,016,603.
U.S. Appl. No. 10/306,759, Oct. 18, 2005, 312 Amendment, U.S. Pat. No. 7,016,603.
U.S. Appl. No. 10/306,759, Dec. 20, 2005, Response to 312 Amendment, U.S. Pat. No. 7,016,603.
U.S. Appl. No. 10/306,759, Jan. 4, 2006, Response to 312 Amendment, U.S. Pat. No. 7,016,603.
U.S. Appl. No. 10/306,759, Nov. 18, 2006, Certificate of Correction, U.S. Pat. No. 7,016,603.
U.S. Appl. No. 11/305,668, Mar. 8, 2006, Office Action, U.S. Pat. No. 7,133,607.

(56) References Cited

OTHER PUBLICATIONS

U.S. Appl. No. 11/305,668, Jun. 8, 2006, Response to Office Action, U.S. Pat. No. 7,133,607.
U.S. Appl. No. 11/305,668, Jun. 13, 2006, Supplemental Response to Request for Clarification by the Examiner, U.S. Pat. No. 7,133,607.
U.S. Appl. No. 11/305,668, Jun. 30, 2006, Notice of Allowance, U.S. Pat. No. 7,133,607.
U.S. Appl. No. 11/305,668, Mar. 29, 2007, Request for Correction of Letters Patent, U.S. Pat. No. 7,133,607.
U.S. Appl. No. 11/488/491, Oct. 16, 2007, Office Action.
U.S. Appl. No. 11/490,322, Apr. 20, 2010, Office Action, U.S. Pat. No. 7,880,761.
U.S. Appl. No. 11/490,322, Jul. 12, 2010, Response to Office Action, U.S. Pat. No. 7,880,761.
U.S. Appl. No. 11/490,322, Sep. 15, 2010, Notice of Allowance, U.S. Pat. No. 7,880,761.
U.S. Appl. No. 11/529,203, Aug. 14, 2007, Office Action, U.S. Pat. No. 7,362,965.
U.S. Appl. No. 11/529,203, Oct. 16, 2007, Terminal Disclaimer, U.S. Pat. No. 7,362,965.
U.S. Appl. No. 11/529,203, Oct. 16, 2007, Response to Office Action, U.S. Pat. No. 7,362,965.
U.S. Appl. No. 11/529,203, Oct. 25, 2007, Terminal Disclaimer, U.S. Pat. No. 7,362,965.
U.S. Appl. No. 11/529,203, Dec. 14, 2007, Notice of Allowance, U.S. Pat. No. 7,362,965.
U.S. Appl. No. 11/697,241, Nov. 8, 2007, Office Action, U.S. Pat. No. 7,437,063.
U.S. Appl. No. 11/697,241, Mar. 10, 2008, Response to Office Action, U.S. Pat. No. 7,437,063.
U.S. Appl. No. 11/697,241, Mar. 24, 2008, Examiner Interview Summary, U.S. Pat. No. 7,437,063.
U.S. Appl. No. 11/697,241, Jun. 9, 2008, Notice of Allowance, U.S. Pat. No. 7,437,063.
U.S. Appl. No. 12/104,950, Dec. 31, 2009, Office Action, U.S. Pat. No. 7,764,875.
U.S. Appl. No. 12/104,950, Feb. 1, 2010, Response to Office Action, U.S. Pat. No. 7,764,875.
U.S. Appl. No. 12/104,950, Mar. 23, 2010, Notice of Allowance, U.S. Pat. No. 7,764,875.
U.S. Appl. No. 12/129,402, Apr. 19, 2010, Notice of Allowance, U.S. Pat. No. 7,783,188.
U.S. Appl. No. 12/129,447, Apr. 12, 2010, Notice of Allowance, U.S. Pat. No. 7,775,575.
U.S. Appl. No. 12/129,447, Apr. 12, 2010, Examiner Amendment, U.S. Pat. No. 7,775,575.
U.S. Appl. No. 12/250,914, Jun. 12, 2009, Office Action, U.S. Pat. No. 7,702,228.
U.S. Appl. No. 12/250,914, Jun. 29, 2009, Response to Office Action and Terminal Disclaimer, U.S. Pat. No. 7,702,228.
U.S. Appl. No. 12/250,914, Oct. 28, 2009, Terminal Disclaimer, U.S. Pat. No. 7,702,228.
U.S. Appl. No. 12/250,914, Dec. 3, 2009, Notice of Allowance, U.S. Pat. No. 7,702,228.
U.S. Appl. No. 12/705,052, Mar. 27, 2012, Office Action, U.S. Pat. No. 8,326,141.
U.S. Appl. No. 12/705,052, Jun. 27, 2012, Response to Office Action, U.S. Pat. No. 8,326,141.
U.S. Appl. No. 12/705,052, Sep. 5, 2012, Notice of Allowance, U.S. Pat. No. 8,326,141.
U.S. Appl. No. 12/705,096, Mar. 12, 2012, Office Action, U.S. Pat. No. 8,326,136.
U.S. Appl. No. 12/705,096, Jun. 12, 2012, Response to Office Action, U.S. Pat. No. 8,326,136.
U.S. Appl. No. 12/705,096, Aug. 8, 2012, Notice of Allowance, U.S. Pat. No. 8,326,136.
U.S. Appl. No. 12/705,164, Mar. 29, 2012, Office Action, U.S. Pat. No. 8,614,766.
U.S. Appl. No. 12/705,164, Jun. 29, 2012, Response to Office Action, U.S. Pat. No. 8,614,766.
U.S. Appl. No. 12/705,164, Sep. 7, 2012, Office Action, U.S. Pat. No. 8,614,766.
U.S. Appl. No. 12/705,164, Nov. 8, 2012, Response to Office Action, U.S. Pat. No. 8,614,766.
U.S. Appl. No. 12/705,164, Nov. 21, 2012, Advisory Action and Applicant Initiated Interview Summary, U.S. Pat. No. 8,614,766.
U.S. Appl. No. 12/705,164, Nov. 29, 2012, RCE, U.S. Pat. No. 8,614,766.
U.S. Appl. No. 12/705,164, Aug. 14, 2013, Notice of Allowance, U.S. Pat. No. 8,614,766.
U.S. Appl. No. 12/762,811, Dec. 28, 2010, Office Action, U.S. Pat. No. 7,970,267.
U.S. Appl. No. 12/762,811, Mar. 28, 2011, Response to Office Action, U.S. Pat. No. 7,970,267.
U.S. Appl. No. 12/762,811, Mar. 28, 2011, Terminal Disclaimer, U.S. Pat. No. 7,970,267.
U.S. Appl. No. 12/762,811, Apr. 20, 2011, Notice of Allowance, U.S. Pat. No. 7,970,267.
U.S. Appl. No. 12/843,254, Jul. 27, 2010, Preliminary Remarks, U.S. Pat. No. 8,121,468.
U.S. Appl. No. 12/843,254, Aug. 25, 2011, Office Action, U.S. Pat. No. 8,121,468.
U.S. Appl. No. 12/843,254, Aug. 25, 2011, Response to Office Action, U.S. Pat. No. 8,121,468.
U.S. Appl. No. 12/843,254, Aug. 25, 2011, Terminal Disclaimer, U.S. Pat. No. 8,121,468.
U.S. Appl. No. 12/843,254, Nov. 28, 2011, Notice of Allowance, U.S. Pat. No. 8,121,468.
U.S. Appl. No. 12/861,445, Sep. 30, 2010, Notice of Allowance, U.S. Pat. No. 7,885,533.
U.S. Appl. No. 13/016,345, Apr. 26, 2013, Restriction Requirement, U.S. Pat. No. 8,803,989.
U.S. Appl. No. 13/016,345, May 28, 2013, Response to Restriction Requirement, U.S. Pat. No. 8,803,989.
U.S. Appl. No. 13/016,345, Sep. 17, 2013, Office Action, U.S. Pat. No. 8,803,989.
U.S. Appl. No. 13/016,345, Mar. 17, 2014, Response to Office Action, U.S. Pat. No. 8,803,989.
U.S. Appl. No. 13/016,345, Apr. 10, 2014, Notice of Allowance, U.S. Pat. No. 8,803,989.
U.S. Appl. No. 13/016,345, Jul. 23, 2014, Issue Notification, U.S. Pat. No. 8,803,989.
U.S. Appl. No. 13/021,951, Nov. 25, 2011, Notice of Allowance, U.S. Pat. No. 8,331,776.
U.S. Appl. No. 13/021,951, Feb. 13, 2012, Withdrawal of Notice of Allowance, U.S. Pat. No. 8,331,776.
U.S. Appl. No. 13/021,951, Feb. 22, 2012, Office Action, U.S. Pat. No. 8,331,776.
U.S. Appl. No. 13/021,951, Jul. 20, 2012, Response to Office Action, U.S. Pat. No. 8,331,776.
U.S. Appl. No. 13/021,951, Oct. 5, 2012, Notice of Allowance, U.S. Pat. No. 8,331,776.
U.S. Appl. No. 13/169,413, Dec. 20, 2011, Office Action, U.S. Pat. No. 8,180,210.
U.S. Appl. No. 13/169,413, Jan. 16, 2012, Response to Office Action, U.S. Pat. No. 8,180,210.
U.S. Appl. No. 13/169,413, Jan. 16, 2012, Terminal Disclaimers, U.S. Pat. No. 8,180,210.
U.S. Appl. No. 13/169,413, Mar. 22, 2012, Notice of Allowance, U.S. Pat. No. 8,180,210.
U.S. Appl. No. 13/183,046, Feb. 13, 2013, Office Action, U.S. Pat. No. 8,600,224.
U.S. Appl. No. 13/183,046, Apr. 29, 2013, Response to Office Action, U.S. Pat. No. 8,600,224.
U.S. Appl. No. 13/183,046, Jul. 31, 2013, Notice of Allowance, U.S. Pat. No. 8,600,224.
U.S. Appl. No. 13/201,182, May 24, 2013, Restriction Requirement.
U.S. Appl. No. 13/201,182, Aug. 26, 2013, Response to Restriction Requirement.
U.S. Appl. No. 13/201,182, Nov. 18, 2013, Office Action.
U.S. Appl. No. 13/201,185, Nov. 22, 2013, Office Action/Restriction Requirement.

(56) References Cited

OTHER PUBLICATIONS

U.S. Appl. No. 13/201,281, Sep. 25, 2013, Office Action, U.S. Pat. No. 8,917,350.
U.S. Appl. No. 13/201,281, Mar. 24, 2014, Response to Office Action, U.S. Pat. No. 8,917,350.
U.S. Appl. No. 13/201,281, Mar. 24, 2014, Terminal Disclaimer, U.S. Pat. No. 8,917,350.
U.S. Appl. No. 13/201,281, Apr. 21, 2014, Notice of Allowance, U.S. Pat. No. 8,917,350.
U.S. Appl. No. 13/201,281, Dec. 3, 2014, Issue Notification, U.S. Pat. No. 8,917,350.
U.S. Appl. No. 13/208,686, Feb. 6, 2013, Office Action, U.S. Pat. No. 8,705,950.
U.S. Appl. No. 13/208,686, May 6, 2013, Response to Office Action, U.S. Pat. No. 8,705,950.
U.S. Appl. No. 13/208,686, Jul. 15, 2013, Final Office Action, U.S. Pat. No. 8,705,950.
U.S. Appl. No. 13/208,686, Aug. 16, 2013, Applicant Initiated Interview Summary, U.S. Pat. No. 8,705,950.
U.S. Appl. No. 13/208,686, Sep. 16, 2013, Response to Office Action, U.S. Pat. No. 8,705,950.
U.S. Appl. No. 13/208,686, Sep. 30, 2013, Notice of Allowance, U.S. Pat. No. 8,705,950.
U.S. Appl. No. 13/208,706, Dec. 26, 2012, Office Action, U.S. Pat. No. 8,571,406.
U.S. Appl. No. 13/208,706, Mar. 26, 2013, Response to Office Action, U.S. Pat. No. 8,571,406.
U.S. Appl. No. 13/208,706, Jul. 2, 2013, Notice of Allowance, U.S. Pat. No. 8,571,406.
U.S. Appl. No. 13/253,596, Nov. 30, 2011, Office Action, U.S. Pat. No. 8,326,140.
U.S. Appl. No. 13/253,596, Feb. 29, 2012, Response to Office Action, U.S. Pat. No. 8,326,140.
U.S. Appl. No. 13/253,596, Feb. 29, 2012, Terminal Disclaimer, U.S. Pat. No. 8,326,140.
U.S. Appl. No. 13/253,596, May 9, 2012, Final Office Action, U.S. Pat. No. 8,326,140.
U.S. Appl. No. 13/253,596, Jul. 18, 2012, Request for Continued Examination, U.S. Pat. No. 8,326,140.
U.S. Appl. No. 13/253,596, Jul. 18, 2012, Response to Office Action, U.S. Pat. No. 8,326,140.
U.S. Appl. No. 13/253,596, Aug. 9, 2012, Notice of Allowance, U.S. Pat. No. 8,326,140.
U.S. Appl. No. 13/399,333, Jun. 14, 2012, Office Action, U.S. Pat. No. 8,351,774.
U.S. Appl. No. 13/399,333, Sep. 14, 2012, Response to Office Action, U.S. Pat. No. 8,351,774.
U.S. Appl. No. 13/399,333, Sep. 14, 2012, Terminal Disclaimers, U.S. Pat. No. 8,351,774.
U.S. Appl. No. 13/399,333, Sep. 28, 2012, Notice of Allowance, U.S. Pat. No. 8,351,774.
U.S. Appl. No. 13/401,175, May 6, 2013, Office Action, U.S. Pat. No. 8,718,461.
U.S. Appl. No. 13/401,175, Aug. 6, 2013, Response to Office Action, U.S. Pat. No. 8,718,461.
U.S. Appl. No. 13/401,175, Sep. 20, 2013, Notice of Allowance, U.S. Pat. No. 8,718,461.
U.S. Appl. No. 13/401,175, Dec. 16, 2013, Notice to File Corrected Application Papers, U.S. Pat. No. 8,718,461.
U.S. Appl. No. 13/401,175, Jan. 13, 2014, Corrected Notice of Allowability, U.S. Pat. No. 8,718,461.
U.S. Appl. No. 13/401,175, Mar. 20, 2014, Reponse to Notice to File Corrected Application Papers, U.S. Pat. No. 8,718,461.
U.S. Appl. No. 13/401,175, Mar. 20, 2014, Petition to Revive, U.S. Pat. No. 8,718,461.
U.S. Appl. No. 13/401,175, Apr. 1, 2014, Petition Decision to Revive, U.S. Pat. No. 8,718,461.
U.S. Appl. No. 13/401,175, Apr. 16, 2015, Issue Notification, U.S. Pat. No. 8,718,461.
U.S. Appl. No. 13/438,500, Jun. 18, 2012, Office Action, U.S. Pat. No. 8,559,804.
U.S. Appl. No. 13/438,500, Sep. 14, 2012, Response to Office Action, U.S. Pat. No. 8,559,804.
U.S. Appl. No. 13/438,500, Sep. 14, 2012, Terminal Disclaimers, U.S. Pat. No. 8,559,804.
U.S. Appl. No. 13/438,500, Jun. 12, 2013, Notice of Allowance, U.S. Pat. No. 8,559,804.
U.S. Appl. No. 13/692,515, Jun. 24, 2013, Notice of Allowance, U.S. Pat. No. 8,571,401.
U.S. Appl. No. 13/692,550, May 16, 2013, Notice of Allowance, U.S. Pat. No. 8,538,250.
U.S. Appl. No. 13/692,550, Jul. 2, 2013, Supplemental Notice of Allowance, U.S. Pat. No. 8,538,250.
U.S. Appl. No. 13/708,326, Mar. 26, 2013, Notice of Allowance, U.S. Pat. No. 8,526,808.
U.S. Appl. No. 13/735,325, Mar. 15, 2013, Office Action, U.S. Pat. No. 8,532,476.
U.S. Appl. No. 13/735,325, Mar. 21, 2013, Response to Office Action w/Terminal Disclaimers, U.S. Pat. No. 8,532,476.
U.S. Appl. No. 13/735,325, May 14, 2013, Notice of Allowance, U.S. Pat. No. 8,532,476.
U.S. Appl. No. 14/015,336, Nov. 8, 2013, Office Action, U.S. Pat. No. 8,824,882.
U.S. Appl. No. 14/015,336, Apr. 7, 2014, Response to Office Action, U.S. Pat. No. 8,824,882.
U.S. Appl. No. 14/015,336, Apr. 7, 2014, Terminal Disclaimers, U.S. Pat. No. 8,824,882.
U.S. Appl. No. 14/015,336, May 2, 2014, Notice of Allowance, U.S. Pat. No. 8,824,882.
U.S. Appl. No. 14/021,200, Oct. 8, 2013, Office Action.
U.S. Appl. No. 14/270,107, Jun. 3, 2014, Office Action, U.S. Pat. No. 9,354,491.
U.S. Appl. No. 14/270,107, Dec. 3, 2014, Response to Office Action, U.S. Pat. No. 9,354,491.
U.S. Appl. No. 14/270,107, Dec. 3, 2014, Terminal Disclaimer, U.S. Pat. No. 9,354,491.
U.S. Appl. No. 14/270,107, Mar. 6, 2015, Final Office Action, U.S. Pat. No. 9,354,491.
U.S. Appl. No. 14/270,107, Jun. 6, 2015, Response to Office Action, U.S. Pat. No. 9,354,491.
U.S. Appl. No. 14/270,107, Jun. 15, 2015, Notice of Allowance, U.S. Pat. No. 9,354,491.
U.S. Appl. No. 14/270,107, Sep. 2, 2015, RCE, U.S. Pat. No. 9,354,491.
U.S. Appl. No. 14/270,107, Oct. 30, 2015, Notice of Allowance, U.S. Pat. No. 9,354,491.
U.S. Appl. No. 14/270,107, Jan. 4, 2016, RCE, U.S. Pat. No. 9,354,491.
U.S. Appl. No. 14/270,107, Jan. 29, 2016, Notice of Allowance, U.S. Pat. No. 9,354,491.
U.S. Appl. No. 14/456,691, Oct. 23, 2015, Restriction Requirement, U.S. Pat. No. 9,420,157.
U.S. Appl. No. 14/456,691, Nov. 4, 2015, Response to Restriction Requirement, U.S. Pat. No. 9,420,157.
U.S. Appl. No. 14/456,691, Dec. 18, 2015, Office Action, U.S. Pat. No. 9,420,157.
U.S. Appl. No. 14/456,691, Mar. 17, 2016, Response to Office Action, U.S. Pat. No. 9,420,157.
U.S. Appl. No. 14/456,691, Mar. 17, 2016, Terminal Disclaimer, U.S. Pat. No. 9,420,157.
U.S. Appl. No. 14/472,320, Apr. 27, 2015, Office Action, U.S. Pat. No. 9,250,499.
U.S. Appl. No. 14/472,320, Jul. 30, 2015, Response to Office Action, U.S. Pat. No. 9,250,499.
U.S. Appl. No. 14/472,320, Jul. 30, 2015, Terminal Disclaimers, U.S. Pat. No. 9,250,499.
U.S. Appl. No. 14/472,320, Sep. 22, 2015, Notice of Allowance, U.S. Pat. No. 9,250,499.
U.S. Appl. No. 14/987,589, Apr. 8, 2016, Office Action, U.S. Pat. No. 9,602,707.
U.S. Appl. No. 14/533,067, Apr. 15, 2016, Office Action (Ex parte Quayle), U.S. Pat. No. 9,690,169.

(56) References Cited

OTHER PUBLICATIONS

U.S. Appl. No. 14/987,589, Sep. 8, 2016, Response to Office Action, U.S. Pat. No. 9,602,707.
U.S. Appl. No. 14/987,589, Nov. 7, 2016, Notice of Allowance, U.S. Pat. No. 9,602,707.
U.S. Appl. No. 14/987,589, Mar. 1, 2017, Issue Notification, U.S. Pat. No. 9,602,707.
U.S. Appl. No. 14/270,107, May 11, 2016, Issue Notification, U.S. Pat. No. 9,354,491.
U.S. Appl. No. 14/533,067, Jul. 26, 2016, Notice of Allowance, U.S. Pat. No. 9,690,169.
U.S. Appl. No. 14/533,067, Oct. 25, 2016, RCE, U.S. Pat. No. 9,690,169.
U.S. Appl. No. 14/533,067, Nov. 7, 2016, Office Action (Ex parte Quayle), U.S. Pat. No. 9,690,169.
U.S. Appl. No. 14/533,067, Jan. 8, 2017, Response to Office Action, U.S. Pat. No. 9,690,169.
U.S. Appl. No. 14/533,067, Jul. 15, 2016, Response to Office Action, U.S. Pat. No. 9,690,169.
U.S. Appl. No. 14/533,067, Feb. 28, 2017, Notice of Allowance, U.S. Pat. No. 9,690,169.
U.S. Appl. No. 14/533,067, Jun. 7, 2017, Issue Notification, U.S. Pat. No. 9,690,169.
U.S. Appl. No. 15/492,635, Jun. 30, 2017, Notice of Allowance, U.S. Pat. No. 9,918,000.
U.S. Appl. No. 15/492,635, Oct. 2, 2017, Request for Continued Examination, U.S. Pat. No. 9,918,000.
U.S. Appl. No. 15/237,390, Dec. 19, 2016, Notice of Allowance, U.S. Pat. No. 9,635,233.
U.S. Appl. No. 15/237,390, Apr. 5, 2017, Issue Notification, U.S. Pat. No. 9,635,233.
U.S. Appl. No. 15/464,293, Dec. 3, 2018, Preliminary Amendment.
U.S. Appl. No. 15/169,639, Jul. 17, 2018, Office Action.
U.S. Appl. No. 15/633,216, Jan. 12, 2018, Office Action, U.S. Pat. No. 10,156,774.
U.S. Appl. No. 15/633,216, Jul. 12, 2018, Response to Office Action and Terminal Disclaimer, U.S. Pat. No. 10,156,774.
U.S. Appl. No. 15/633,216, Aug. 13, 2018, Notice of Allowance, U.S. Pat. No. 10,156,774.
U.S. Appl. No. 15/633,216, Aug. 30, 2018, Corrected Notice of Allowability, U.S. Pat. No. 10,156,774.
U.S. Appl. No. 15/633,216, Nov. 28, 2018, Issue Notification, U.S. Pat. No. 10,156,774.
PCT/US2003/037271, WO, May 12, 2004, International Search Report.
PCT/US2006/028229, WO, Feb. 12, 2008, International Search Report and Written Opinion.
PCT/US2007/066162, WO, Nov. 9, 2007, International Search Report and Written Opinion.
PCT/US2008/065139, WO, Sep. 25, 2008, International Search Report and Written Opinion.
PCT/US2008/065137, WO, Sep. 25, 2008, International Search Report and Written Opinion.
PCT/US2010/024108, WO, Sep. 2, 2010, International Search Report and Written Opinion.
PCT/US2010/024195, WO, Sep. 16, 2010, International Search Report and Written Opinion.
PCT/US2010/024088, WO, Jul. 16, 2010, International Search Report and Written Opinion.
PCT/US2012/025915, WO, Jun. 8, 2012, International Search Report and Written Opinion.
PCT/US2011/044008, WO, Nov. 17, 2011, International Search Report and Written Opinion.
CN2007-80020420.4, CN, Jun. 13, 2010, Chinese Office Action.
CN2010-10600736.4, CN, Feb. 7, 2012, Chinese Office Action.
EP07760263.9, EP, Jan. 4, 2011, European Search Report.
EP07760263.9, EP, Jul. 27, 2011, Response to European Search Report.
EP8756458.9, EP, Jul. 22, 2011, European Search Report.
EP11177995.5, EP, Dec. 12, 2011, European Search Report.
EP11177995.5, EP, Jul. 11, 2012, Response to European Search Report.
EP11177997.1, EP, Dec. 13, 2012, European Search Report.
EP11177995.5, EP, Aug. 23, 2012, First Examination Report.
EP10741797, EP, Aug. 23, 2012, Extended European Search Report.
JP2010-510491, JP, Aug. 22, 2012, Japanese Office Action.
CN2010-10600736.4, CN, Dec. 5, 2012, Chinese Office Action.
CA2616030, CA, Jan. 7, 2013, Canada Office Action.
CA2648798, CA, Sep. 27, 2013, Canada Office Action.
U.S. Appl. No. 10/306,759, Nov. 26, 2002, U.S. Pat. No. 7,016,603.
U.S. Appl. No. 11/305,668, Dec. 16, 2005, U.S. Pat. No. 7,133,607.
U.S. Appl. No. 11/490,322, Jul. 20, 2006, U.S. Pat. No. 7,880,761.
U.S. Appl. No. 11/529,203, Sep. 27, 2006, U.S. Pat. No. 7,362,965.
U.S. Appl. No. 11/697,241, Apr. 5, 2007, U.S. Pat. No. 7,437,063.
U.S. Appl. No. 12/104,950, Apr. 17, 2008, U.S. Pat. No. 7,764,875.
U.S. Appl. No. 12/129,402, May 29, 2008, U.S. Pat. No. 7,783,188.
U.S. Appl. No. 12/129,447, May 29, 2008, U.S. Pat. No. 7,775,575.
U.S. Appl. No. 12/250,914, Oct. 14, 2008, U.S. Pat. No. 7,702,228.
U.S. Appl. No. 12/705,052, Feb. 12, 2010, U.S. Pat. No. 8,326,141.
U.S. Appl. No. 12/705,096, Feb. 12, 2010, U.S. Pat. No. 8,326,136.
U.S. Appl. No. 12/705,164, Feb. 12, 2010, U.S. Pat. No. 8,614,766.
U.S. Appl. No. 12/762,811, Apr. 19, 2010, U.S. Pat. No. 7,970,267.
U.S. Appl. No. 12/843,254, Jul. 26, 2010, U.S. Pat. No. 8,121,468.
U.S. Appl. No. 12/861,445, Aug. 23, 2010, U.S. Pat. No. 7,885,533.
U.S. Appl. No. 13/016,345, Jan. 28, 2011, U.S. Pat. No. 8,803,989.
U.S. Appl. No. 13/021,951, Feb. 7, 2011, U.S. Pat. No. 8,331,776.
U.S. Appl. No. 13/169,413, Jun. 27, 2011, U.S. Pat. No. 8,180,210.
U.S. Appl. No. 13/183,046, Jul. 14, 2011, U.S. Pat. No. 8,600,224.
U.S. Appl. No. 13/201,182, Aug. 11, 2011.
U.S. Appl. No. 13/201,185, Aug. 11, 2011.
U.S. Appl. No. 13/201,281, Aug. 12, 2011, U.S. Pat. No. 8,917,350.
U.S. Appl. No. 13/208,686, Aug. 12, 2011, U.S. Pat. No. 8,705,950.
U.S. Appl. No. 13/208,706, Aug. 12, 2011, U.S. Pat. No. 8,571,406.
U.S. Appl. No. 13/253,596, Oct. 5, 2011, U.S. Pat. No. 8,326,140.
U.S. Appl. No. 13/399,333, Feb. 17, 2012, U.S. Pat. No. 8,351,774.
U.S. Appl. No. 13/401,175, Feb. 21, 2012, U.S. Pat. No. 8,718,461.
U.S. Appl. No. 13/438,500, Apr. 3, 2012, U.S. Pat. No. 8,559,804.
U.S. Appl. No. 13/692,515, Dec. 3, 2012, U.S. Pat. No. 8,571,401.
U.S. Appl. No. 13/692,550, Dec. 3, 2012, U.S. Pat. No. 8,538,250.
U.S. Appl. No. 13/708,326, Dec. 7, 2012, U.S. Pat. No. 8,526,808.
U.S. Appl. No. 13/735,325, Jan. 7, 2013, U.S. Pat. No. 8,532,476.
U.S. Appl. No. 14/015,336, Aug. 30, 2013, U.S. Pat. No. 8,824,882.
U.S. Appl. No. 14/201,200, Sep. 9, 2013.
U.S. Appl. No. 14/270,107, May 5, 2014, U.S. Pat. No. 9,354,491.
U.S. Appl. No. 14/456,691, Aug. 11, 2014, U.S. Pat. No. 9,420,157.
U.S. Appl. No. 14/472,320, Aug. 28, 2014, U.S. Pat. No. 9,250,499.
U.S. Appl. No. 14/533,067, Nov. 4, 2014, U.S. Pat. No. 9,690,169.
U.S. Appl. No. 14/987,589, Jan. 4, 2016, U.S. Pat. No. 9,602,707.
U.S. Appl. No. 15/237,390, Aug. 15, 2016, U.S. Pat. No. 9,635,233.
U.S. Appl. No. 15/492.635, Apr. 20, 2017, U.S. Pat. No. 9,918,000.
U.S. Appl. No. 15/464,293, Mar. 20, 2017.
U.S. Appl. No. 15/169,638, May 31, 2016.
U.S. Appl. No. 15/633,216, Jun. 26, 2017, U.S. Pat. No. 10,156,774.

* cited by examiner

PHOTOGRAPHIC LIGHTING SYSTEM AND METHOD

RELATED APPLICATION DATA

This application is a continuation of U.S. patent application Ser. No. 15/633,216, titled "Photographic Lighting System and Method," filed Jun. 26, 2017, which is a continuation application of U.S. patent application Ser. No. 14/533,067, titled "Photographic Lighting System and Method," filed on Nov. 4, 2014, each of which is incorporated by reference herein in its entirety.

This application also claims the benefit of priority of U.S. Provisional Patent Application Ser. No. 61/899,870, filed Nov. 4, 2013, and titled "Photographic Lighting System and Method," which is incorporated by reference herein in its entirety.

FIELD OF THE INVENTION

The present invention generally relates to the field of photographic lighting. In particular, the present invention is directed to a photographic strobe system and method.

BACKGROUND

Proper lighting is an essential element for creating desirable photographs. While many photographs are made using only natural or other ambient lighting, many more are made using dedicated photographic lighting provided solely for the purpose of capturing photographic images having the "right" exposure desired by the photographer. Common photographic lighting devices are strobes and other flashes.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

The present disclosure includes description of implementations of a photographic lighting device system and method involving multiple electrical energy storage/discharge (EESD) elements and/or multiple light sources in a single photographic lighting device to perform one or more photographic lighting effects.

A photographic lighting device is a device that provides light that can be used during photographic image acquisition. Examples of a photographic lighting device include, but are not limited to, a flash device, a constant light source, a near constant light source, and any combinations thereof. Examples of a flash device include, but are not limited to, a strobe device (e.g., a studio strobe light), a photographic speedlight, and any combinations thereof. Several examples below that are described with respect to FIGS. 2 to 18 utilize the term "strobe" and "strobe device" for convenience. It is contemplated and should be understood that where these terms are used herein, any photographic lighting device could also be used in place of the "strobe." For example, a photographic speedlight can replace the studio strobe and have the features and structures described below.

Figure 1:
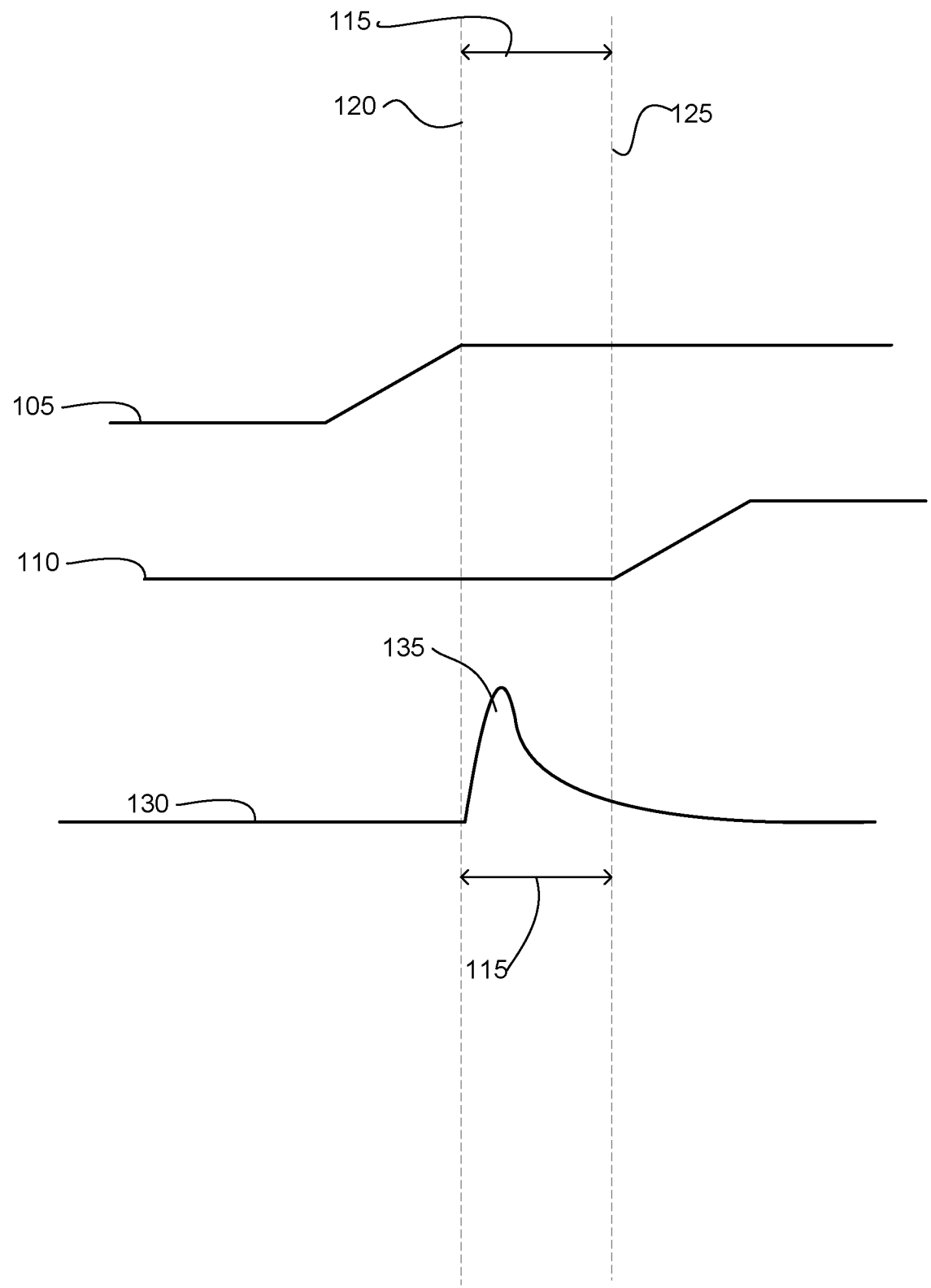
FIG. 1 is a one example of an image acquisition in a camera that has two moving shutters.

A photographic image acquisition typically involves the use of a camera having a sensor for capturing an image. Example sensors include, but are not limited to, an electronic sensor, a film sensor, and any combinations thereof. Many modern cameras (e.g., a digital SLR camera) utilize electronic sensors. An image acquisition window is a timeframe in which an image is acquired (e.g., using a photographic sensor). The beginning and end of an image acquisition window may be controlled in various ways known in the photographic arts. In one example, a camera may include one or more shutters for blocking and/or allowing light to pass to a sensor. In another example, electronic gating of a sensor can be utilized to start and stop an image acquisition window (e.g., gating the data acquisition from an electronic sensor in a shutter-less camera). FIG. 1 illustrates one example of an image acquisition in a camera that has two moving shutters (a first shutter and a second shutter). In a starting position, the shutter mechanism is closed and blocks light to a sensor of the camera. The first shutter blade moves to open and expose the sensor to the light of the image (e.g., light passing through an aperture of a lens). The second shutter blade moves to close and block light from passing to the sensor. At slower shutter speeds (i.e., longer exposures), the first shutter may stop movement and be fully open before the second shutter starts to move to block the sensor. At faster shutter speeds (i.e., shorter exposures), the second shutter blade may start to block the sensor prior to the first shutter blade completing its movement across the sensor. In FIG. 1, a plot 105 shows the position of a first shutter blade over time. The initial flat portion of the plot indicates a position that blocks light to a sensor. The later flat portion of the plot indicates a position in which the first shutter is no longer moving and no longer blocks light to the sensor. The sloped portion of the plot indicates the movement of the first shutter blade across the sensor from the position that blocks light to the position that allows light to pass. During the sloped portion the shutter blade partially blocks the sensor. Plot 110 shows the position of a second shutter blade over time. The initial flat portion of the plot indicates a position of the second shutter blade that allows light to pass to the sensor. The later flat portion of the plot indicates a position of the second shutter blade that in which the shutter blade blocks light to the sensor. The sloped portion of the plot indicates the movement of the second shutter blade across the sensor from the position that allows light to pass to the position that blocks light. During the sloped portion the second shutter blade partially blocks light to the sensor.

Time segment 115 (between dotted lines 120 and 125) indicates a segment of time in which neither shutter blade is blocking light to the sensor. This time segment can be viewed as an image acquisition window. In another example, an image acquisition window starts at the beginning of first shutter blade movement and ends at the end of second shutter blade movement. In yet another example, an image acquisition window starts when the first shutter blade moves to a position that starts to allow light to pass to a sensor (this position may be some time after the blade starts to move due to space on the side of a sensor over which a blade may move) and ends when a second shutter blade moves to a position that fully blocks light from passing to the sensor (this position may be some time before the blade stops movement). In still another example, an image acquisition window may be gated electronically with or without shutter movements. A shutter speed of an image acquisition is typically the time between the first shutter blade starting to move and the second shutter blade starting to move (this can also be measured from the time when the first shutter blade stops movement to the second shutter blade stopping movement). As discussed above, at faster shutter speeds (e.g., greater than $\frac{1}{250}^{th}$ of a second) the movement of the shutter blades may overlap providing for no fully open image acquisition window. In such an example, an open slit between the shutter blade edges allows light to pass to different portions of the sensor as the slit moves across the sensor.

FIG. 1 shows a plot of light emission intensity 130 for a photographic lighting device that is caused to emit light in association with the image acquisition window for the camera. A flash pulse of light 135 is emitted in time segment 115 such that the light emission is available to the sensor during the fully open image acquisition window. In one example, at faster shutter speeds an image acquisition window can be measured from the time when the first shutter blade moves to a position that starts to allow light to pass to a sensor and ends when a second shutter blade moves to a position that fully blocks light from passing to the sensor.

It is noted that the plotting of a first and second shutter blade movement can be combined into a single plot that looks a bit like a parallelogram. This type of plot is used below with respect to FIGS. 3 to 13 to show exposure periods associated with various light emissions.

In some examples of TTL ("through the lens") flash photography, a preflash is utilized to provide light to a scene that is measured through the lens of the camera. A preflash typically occurs prior to image acquisition (e.g., prior to a first shutter blade beginning movement). The measurement of the light is utilized to determine a power level for a main flash that will be used during image acquisition. Prior art systems known to the inventor utilize a single flash light source for both the preflash and the main flash. For example, a photographic speedlight includes a single flash tube for emitting light for both the preflash and the main flash.

A photographic lighting device may include two or more EESD elements for providing flexibility to the type of light emission during an image acquisition window, the number of light emissions during an image acquisition window, and/or the position of one or more light emissions during an image acquisition window. Such a photographic lighting device may provide a variety of light emission functionalities. Example functionalities that may be provided by a multiple EESD element single photographic lighting device include, but are not limited to, using a first light source coupled to one or more EESD elements as a TTL preflash and a second light source of the same lighting device for a main TTL flash; using multiple EESD elements fired together (e.g., coupled to multiple light sources, coupled to a single light source) to emit light for a single image acquisition; using multiple EESD elements fired in series (e.g., coupled to a single light source, coupled to multiple light sources) to emit light for a single image acquisition; using multiple EESD elements fired in series (e.g., coupled to multiple light sources, coupled to a single light source) to emit light for a series of multiple image acquisitions; using a first EESD element to power a first light source for a flash-type light emission and a second EESD element to power a second light source for constant/near constant light emission during a single image acquisition (e.g., having the flash-type light emission occur at the beginning of the exposure with the constant/near constant light emission at the later portion of the exposure (first curtain flash pop), having the flash-type light emission occur at the end of the exposure with the constant/near constant light emission at the earlier portion of the exposure (rear-curtain flash pop)); and any combinations thereof.

In one example, a lighting device includes a single light source coupled to the two or more EESD elements. In another example, a lighting device includes a plurality of light sources coupled to the two or more EESD elements. In one such example, each light source is coupled to a corresponding one of the two or more EESD elements. In another such example, two or more of the plurality of light sources are coupled to each of the two or more EESD elements. In yet another such example, two or more of the two or more EESD elements are coupled to each one of the plurality of light sources. In still another example, a combination of any of the previous examples is employed in a photographic lighting device. While several of the example implementations below will be discussed with respect to two or more EESD elements, it is contemplated that a single EESD element may be utilized with two or more light sources to provide one or more of the functionalities discussed below in each of the examples.

An EESD element includes storage circuitry for storing electrical energy necessary to power a light source of a photographic lighting device. A storage circuitry includes one or more storage devices. An example storage device is a capacitor. In one example, a storage circuitry and/or its one or more storage devices are capable of rapidly charging and discharging for allowing a light source to function as necessary to provide a desired light output. An EESD may also include and/or be associated with control circuitry for controlling the charging, discharging, and other operation of the EESD.

A light source for a photographic lighting device may be any light source capable of providing a desired light output for photographic image acquisition. Example light sources include, but are not limited to, a gas discharge tube (e.g., a halogen lamp, a xenon lamp), an LED (light emitting diode/device), an incandescent lamp, and any combinations thereof.

In one exemplary implementation, a photographic lighting device includes two or more light sources. A first light source is configured to fire a TTL preflash. A second light source is configured to fire a TTL main flash. In one example, each of the first light source and the second light source are connected to and powered by a separate corresponding one or more EESD elements. In another example, each of the first light source and the second light source are connected to and powered by the same one or more EESD elements. The first light source and the second light source can be of the same type or of different types. In one example, the second light source is a light source having a higher power output capacity than the first light source. In one such example, each light source is connected to its own EESD element/bank with the first light source providing a lower power output TTL preflash and the second light source providing a higher power output TTL main flash.

Some single light source lighting devices have a light source that has a minimum amount of power that can be applied thereto to cause light emission such that a light emission from such a light source may overpower (e.g., saturate) a sensor (e.g., a TTL metering sensor) of a camera if the light source is used for TTL preflash. Overpowering a sensor (e.g., a TTL metering sensor) may prevent a camera from providing proper main flash power information such that improper exposure may occur. In one exemplary aspect, an example lighting device with two light sources can include a light source that is capable of emitting light at a low enough power to provide a TTL preflash and a light source that is capable of emitting light at high enough power to provide a TTL main flash. In such an example, a higher power light source may also be capable of typical non-TTL (or TTL) high power studio strobe flash output levels, while having a second light source capable of providing a TTL preflash.

In one example, where two light sources are utilized for TTL preflash and main flash emission, the first light source for TTL preflash is in substantially similar optical path alignment with the second light source for TTL mainflash such that they both cast light in substantially similar beam angles upon a subject. One such example would be concentric ring tube light sources one within the other. In another example, the two light sources are selected with color temperature characteristics that are substantially similar such that metering of preflash is based on the same color temperature range as the main flash exposure. In one such example, this may provide a balanced exposure accuracy when a preflash and main flash have substantially the same color spectrum.

A photographic lighting device may include a crossover circuitry that will allow a second light source configured for TTL main flash output to be utilized for a TTL preflash at a higher power. For example, some camera bodies are configured for a low power TTL preflash and a high power TTL preflash. In one such example, a Nikon camera may provide a first low power TTL preflash command to a flash device and if insufficient light is detected through the lens for the first preflash, a second high power TTL preflash command can be provided to a flash device for providing a higher power preflash for TTL (e.g., to improve signal to noise). A crossover circuitry can be configured with hardware and/or executable instructions for a processing element/control circuitry for detecting a higher power TTL command from a camera and switching to using a higher power light source of the photographic lighting device for TTL preflash.

In some examples, a lower power TTL preflash may be needed when a subject is very close to a light source and/or when a low aperture lens (e.g., F1.4, F1.8, F2.8) is utilized at its larger open apertures.

In another exemplary implementation, a photographic lighting device includes two or more EESD elements coupled to one or more light sources for providing multiple symmetric light emissions within a single image acquisition. In one example, two or more EESD elements are coupled to a single light source. In another example, each of two or more EESD elements are coupled to a corresponding light source. Other combinations of EESD elements and light sources (e.g., other various combinations of multiple to single, multiple to multiple, single to single, etc.) are contemplated. In one example of multiple symmetric light emissions, a first light emission is powered by one or more EESD elements of the photographic lighting device and a second light emission is powered by one or more EESD elements of the photographic lighting device. The two light emissions are positioned in an image acquisition window such that they are spaced apart by a time period approximately the same as the shutter speed/exposure time for the image acquisition. In one example, spacing apart light emissions occurs by using an energy balance point (such as a half energy point for a light emission curve) for a light emission profile for the light source and spacing the energy balance point for each light emission within an image acquisition window such that the energy balance point of the first light emission is spaced a time period approximately the same (e.g., the same) as the exposure time/shutter speed value for the image acquisition from the energy balance point of the second light emission. The two light emissions can be approximately centered (e.g., centered) within the image acquisition window. In another example, the two light emissions can be positioned other than centrally in the image acquisition window.

In one example, a higher efficiency of light power output may be obtained by using two or more light emissions in a single image acquisition. In one such example, an improvement of 0.4 to 0.8 stops of light power efficiency over a typical HSS (high speed sync) or FP-sync (focal plane sync) in which a flash emission is kept near constant from before first shutter blade movement until after second shutter blade movement.

Three or more flash emissions may be utilized in other examples. In one such example, the spacing between light emissions is a time period equivalent to (exposure time/N−1), where N is the number of light emissions.

Figure 2:
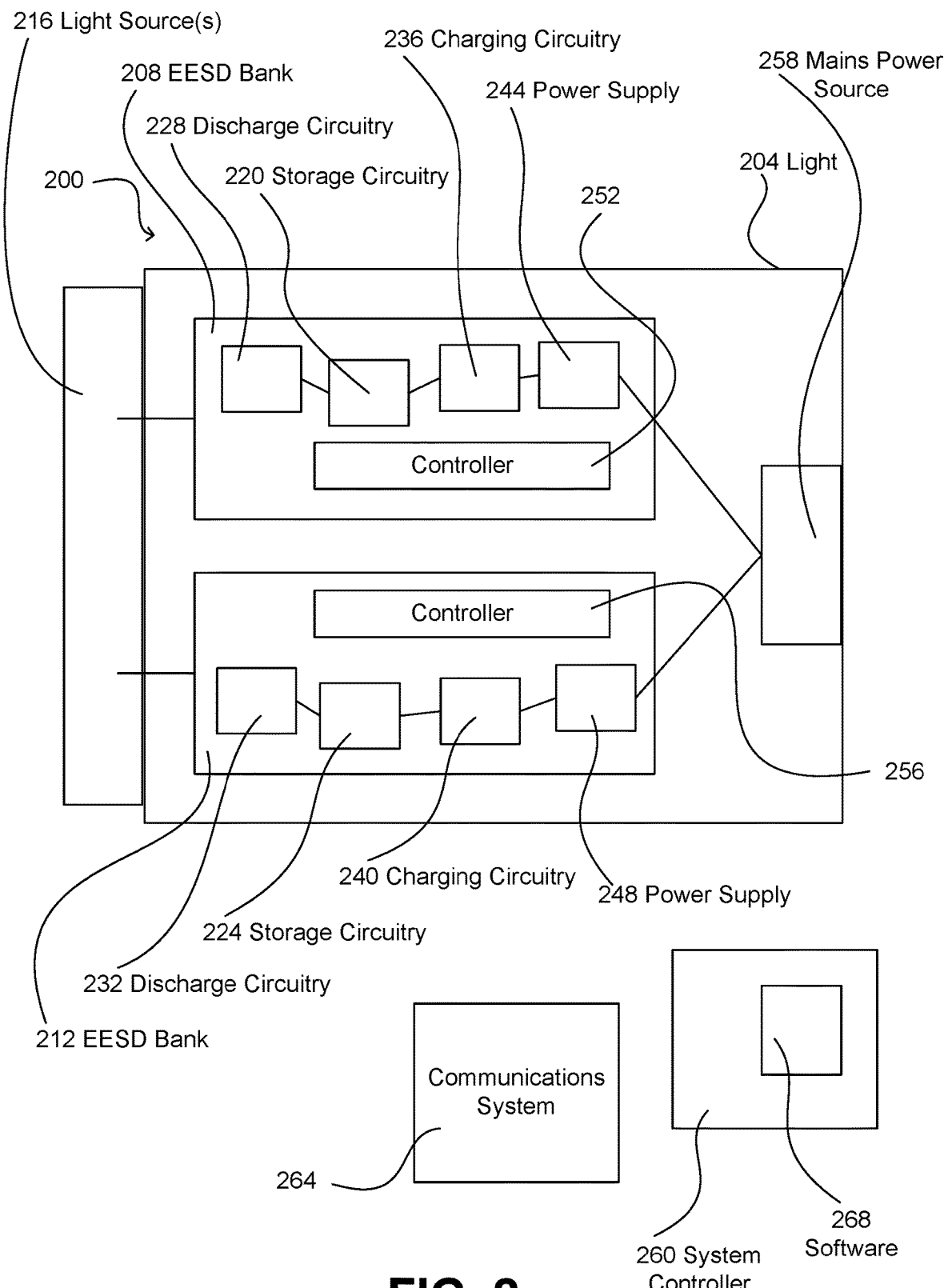
FIG. 2 is a high-level block/schematic diagram of an example of a photographic strobe system.

Additional examples are now discussed with respect to FIGS. 2 to 18. These examples and their aspects may be applied in any combination with the implementations discussed above. Referring now to FIG. 2, this figure illustrates a photographic strobe system 200 having a strobe light 204 and multiple electrical energy storage/discharge (EESD) banks, in this example two EESD banks 208, 212, that are independently operable relative to one another. As will be described below in detail, this independent operability of the multiple EESD banks gives a photographer great flexibility in controlling the amount and type of light provided by the photographic strobe system. Examples of type of light output that system 200 can be configured to output include: a through-the-lens (TTL) exposure flash (or "pre-flash"); a single image-capture exposure flash powered by one or more of the multiple EESD banks; an image-capture exposure burst powered by interleaving the discharges from the multiple EESD banks; an image-capture exposure continuous output; and any combination of these. Specific examples of these will be described below following a more detailed description of system 200.

Strobe light 204 includes one or more light sources 216 capable of providing both high-intensity flash light characteristic of flash photography and lower intensity constant or near-constant level light output. By "near-constant" it is meant that light source(s) 216 may be pulsed in a manner that simulates constant level light but nonetheless has inconsequential variations in level as an artifact of the pulsed operation. Examples of light sources suitable for use in strobe light 204 include, but are not limited to, electronic gas discharge lamps (such as xenon discharge lamps) and light-emitting diodes, and any combination thereof, among others. When one or more xenon lamps (color temperature of about 5500K to 6000K) are used as light source(s) 216 with, for example, a conventional current-generator digital single-lens-reflex (DSLR) camera, a TTL pre-flash can be a relatively low-intensity flash on the order of 8 microseconds to 1 ms, a single image-capture expose flash is a relatively high-intensity flash (for example, on the order of 1 ms), an image-capture exposure burst is a rapid series of single image-capture exposure flashes over, for example, one second or more, and an image-capture exposure constant-level output is a relatively low-to-moderate-intensity flash over a period of, for example, between 1 ms and 5 ms in a manner the same as or similar to focal-plane (FP) sync. FIGS. 3 to 7 illustrate exemplary intensity-versus-time curves and corresponding exemplary exposure periods for the flash modes just mentioned.

Figure 3:
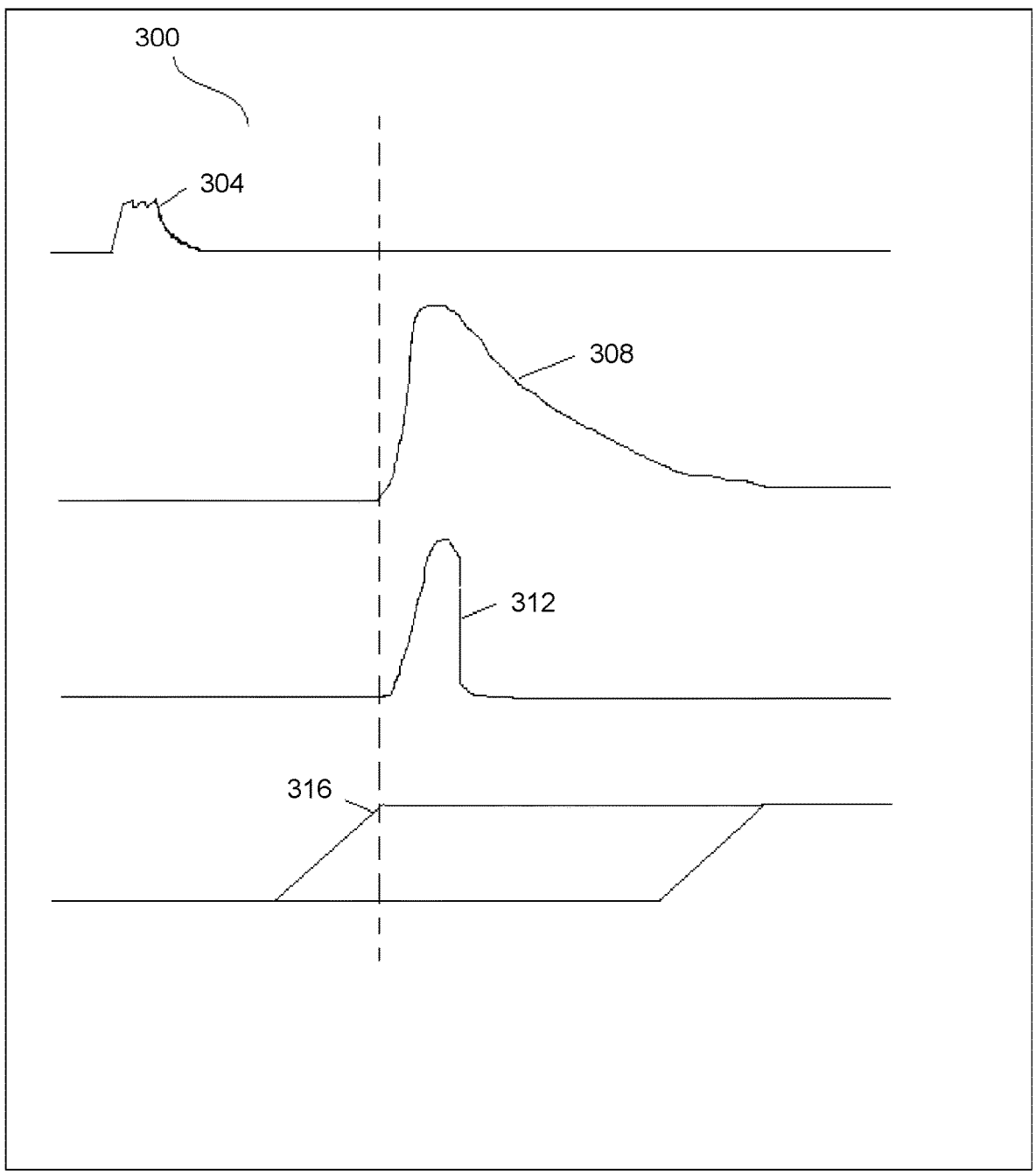
FIG. 3 is graph of exemplary flash intensity-versus-time curves for a TTL pre-flash, a full-power, first-curtain image-capture flash and a reduced-power, first curtain image-capture flash.
Figure 4:
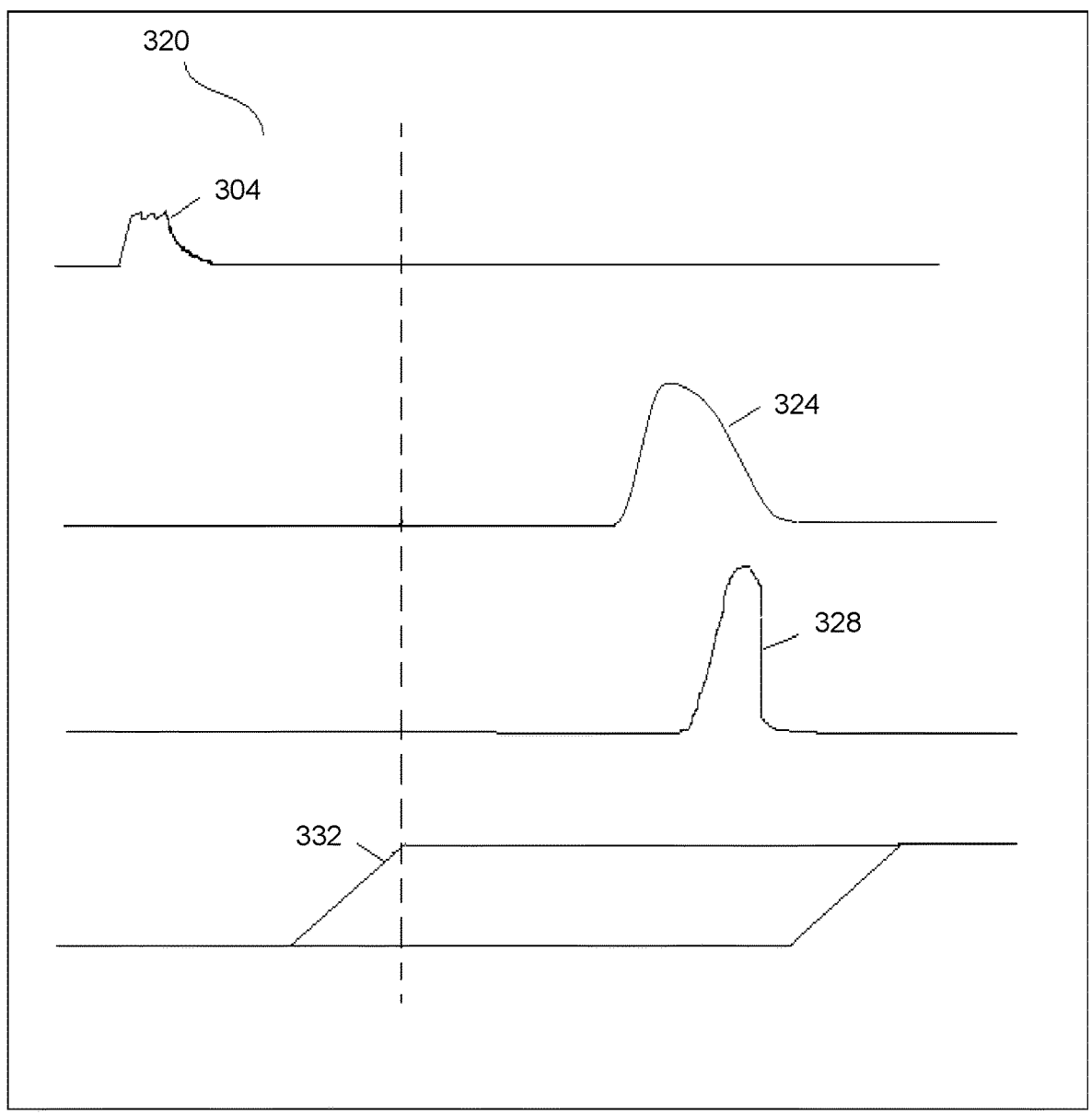
FIG. 4 is a graph of exemplary flash intensity-versus-time curves for a full-power, second-curtain image-capture flash and a reduced-power, second curtain image-capture flash.
Figure 5:
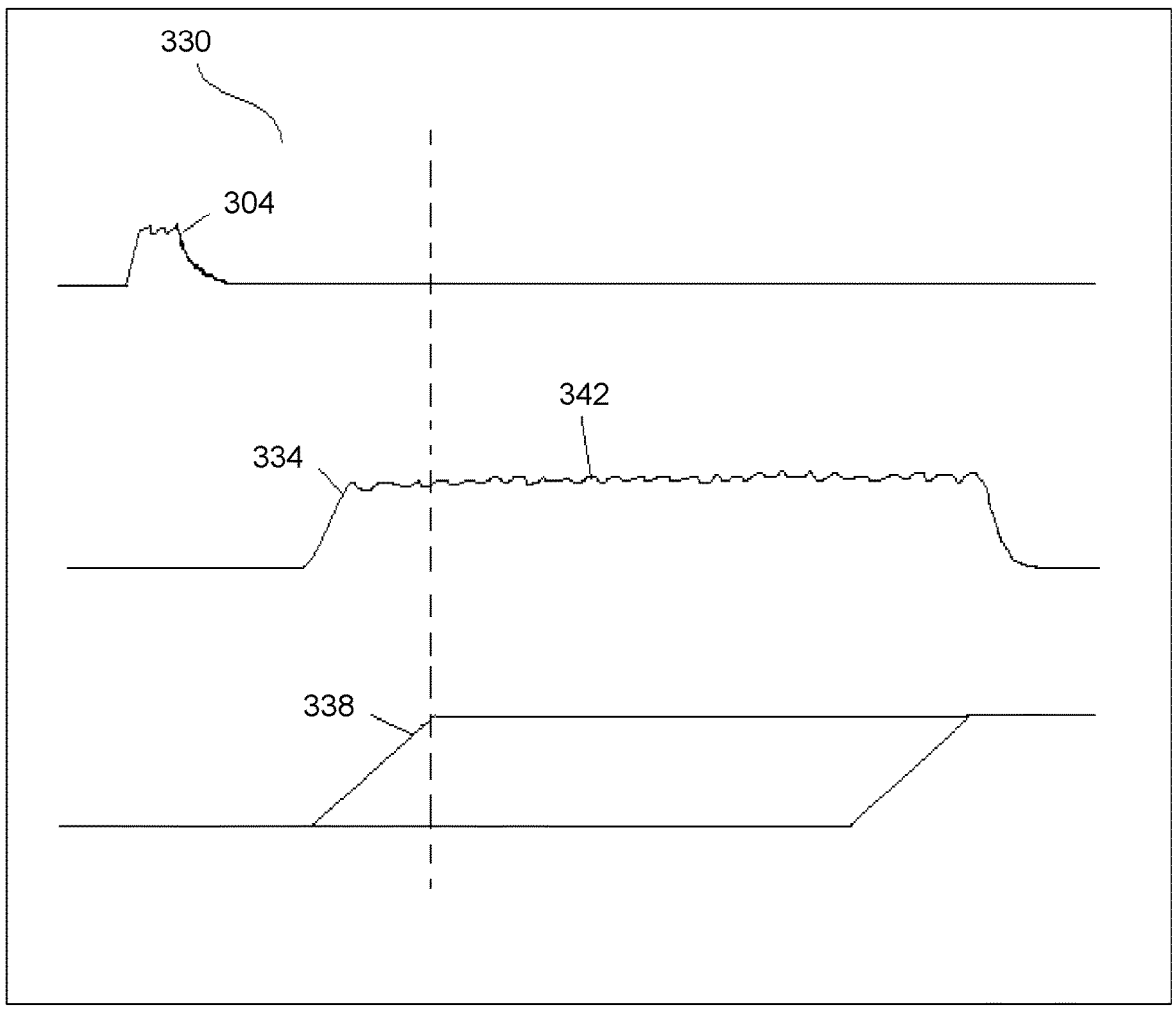
FIG. 5 is a graph of an exemplary flash intensity-versus-time curve for a constant-level image-capture flash.
Figure 6:
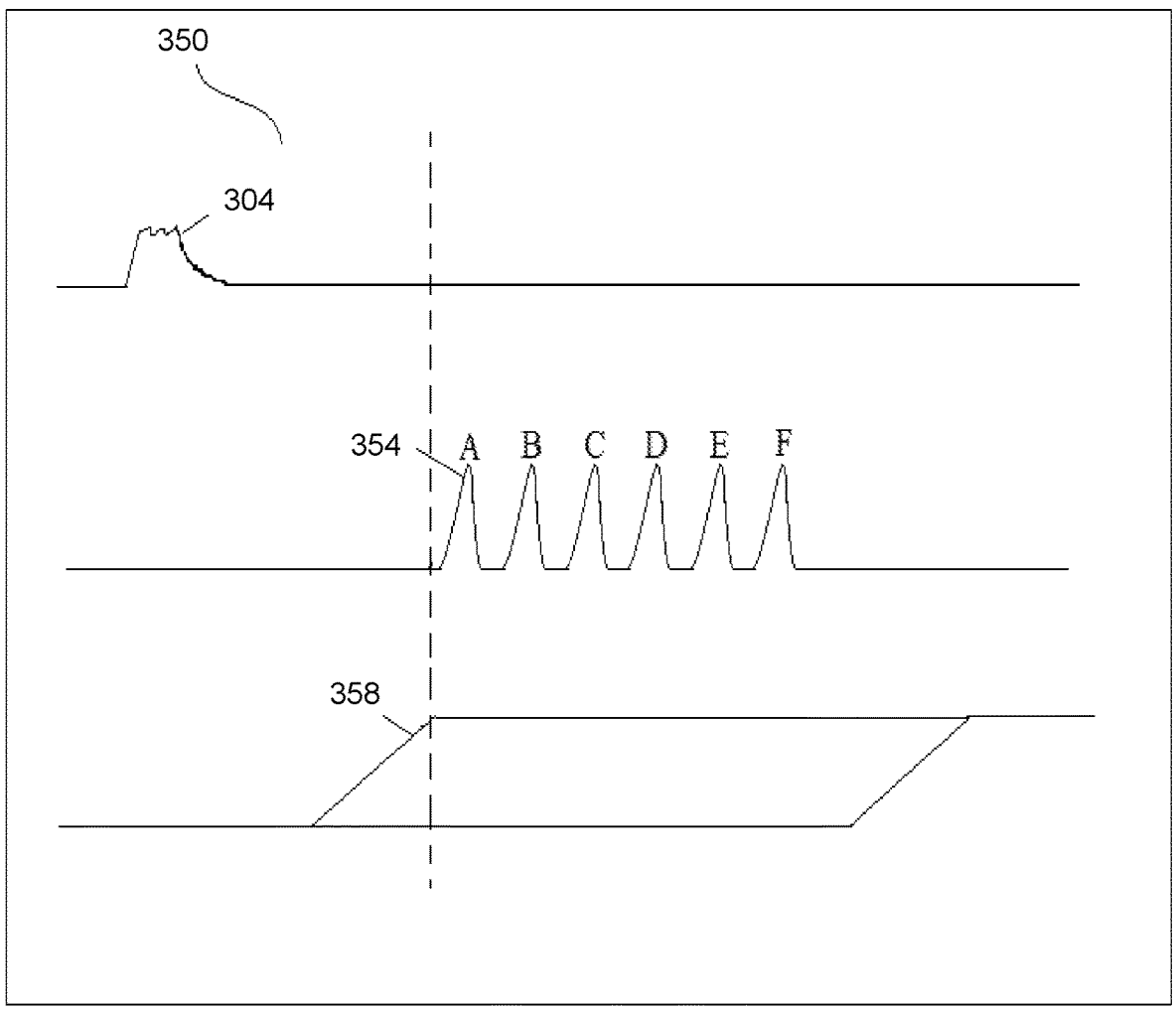
FIG. 6 is a graph of exemplary flash intensity-versus-time curves for multiple flashes strobed within a single exposure period.
Figure 7:
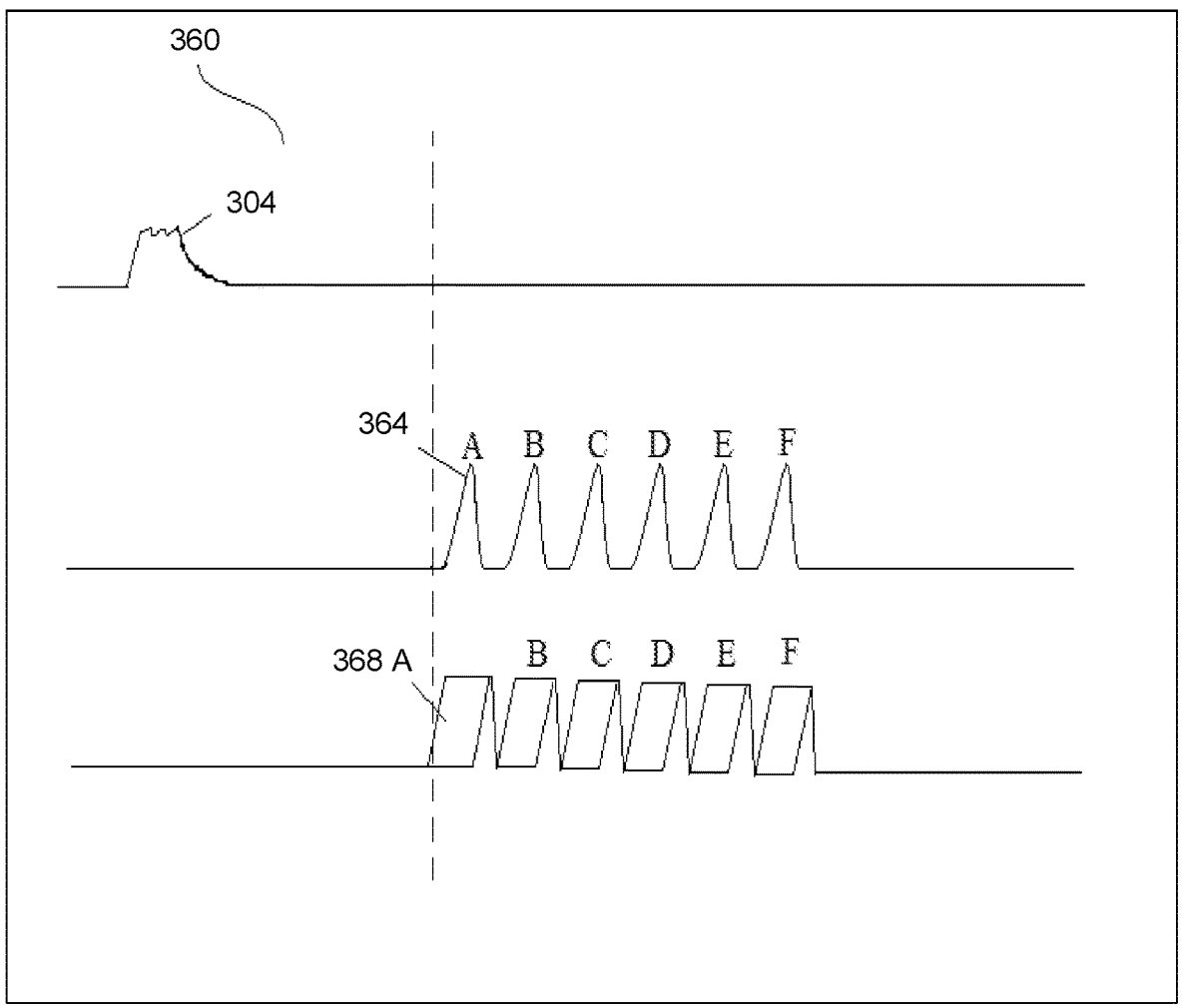
FIG. 7 is a graph of exemplary flash intensity-versus-time curves for multiple rapidly fired flashes for rapidly capturing sequential images.

Referring first to FIG. 3, this figure is a graph 300 illustrates intensity-versus-time curves for a TTL pre-flash (curve 304), a full-power, first-curtain image-capture flash (curve 308) and a reduced-power, first curtain image-capture flash (curve 312). Also shown is a characteristic exposure period 316 for capturing a single image to provide a reference for the occurrences of the various flashes relative to the exposure period. As readily seen, the TTL pre-flash (curve 304) occurs prior to the start of exposure period 316 and the full- and reduced-power first-curtain flashes (curves 308, 312, respectively) occur very shortly after the start of exposure period. FIG. 4 is a graph 320 illustrating intensity-versus-time curves for two second-curtain image-capture flashes, a full-power flash (curve 324) and a reduced-power flash (curve 328), relative to an exemplary exposure period 332. FIG. 5 is a graph 330 illustrating an intensity-versus-time curve 334 constant-level image-capture flash over a corresponding exposure period 338. As those skilled in the art will understand, curve includes a series of small peaks 342 caused by very rapid pulsing of the xenon light source. Curve 334 is very similar to a like-curve for the familiar focal-plane (FP) sync flash. FIG. 6 is a graph 350 containing a plurality of intensity-versus-time curves 354A-F representing a series of like-power image-capture flashes that all occur within a single, relatively long exposure period 358. As those skilled in the art will understand, graph 350 is characteristic of the classic strobe situation in which motion of a subject appears to be stopped in the acquired image at each time corresponding to the respective curve 354A-F within exposure period 358. FIG. 7 contains a graph 360 containing curves 364A-F that also represent like-power image-capture flashes. But instead of these flashes all occurring within a single exposure period as in graph 350, each of the flashes represented in graph 360 of FIG. 7 corresponds to a separate exposure 368A-F. Thus, graph 360 represents the rapid acquisition of a series of images using flash-lighting.

Referring again to FIG. 2, each EESD bank 208, 212 includes, respectively, storage circuitry 220, 224 for storing the electrical energy necessary to power strobe light 204. Each storage circuitry 220, 224 includes one or more storage devices (not shown), such as one or more capacitors, capable of the rapid charging and discharging necessary for system to provide the desired functionality. Such storage devices are known in the art, such that further explanation is not necessary. Each EESD bank 208, 212 also includes corresponding discharge circuitry 228, 232 for controlling the discharge of electrical energy from the corresponding storage circuitry 220, 224 to light source(s) 216, thereby controlling the intensity and duration of the light output from strobe light 204. As those skilled in the art will readily appreciate, discharge circuitries 228, 232 includes electronic components necessary to give system 200 the proper functionality. For example, if one or more xenon discharge lamps are used for light source(s) 216, such other components (not shown) might include, for example, one or more discharge quenching components, such as a quench tube, an insulated-gate bipolar transistor or other device that assists with the operation of system 200 during partial discharges, such as pre-flash discharges, reduced-power image-capture exposure flashes, etc. Those skilled in the art will readily understand how to design discharge circuitries 228, 232 appropriate for the type of light source(s) 216 used, such that further description of these circuitries is not necessary for those skilled in the art to make and use photographic strobe system 200.

EESD banks 208, 212 also includes corresponding respective charging circuitries 236, 240 configured for charging the respective storage circuitry 220, 224 from a suitable power source, here a pair of high-voltage power supplies 244, 248 that receive their power from a mains power source 258. Examples of mains power source 258 include, but are not limited to, an external battery, an internal battery, an A/C power supply (e.g. a connection via a power plug to an A/C power supply), a D/C power supply (e.g. a connection via a power plug to a D/C power supply). In other embodiments, the power for charging circuitries 236, 240 can be from a single power supply, and/or the power for the one or more power supplies can be from a source other than a mains power source, such as a battery. Those skilled in the art will readily understand how to design charging circuitries 236, 240 and high-voltage power supplies 244, 248 appropriate for the type storage circuitries 220, 224 used, such that further description of those circuitries and power supplies is not necessary for those skilled in the art to make and use photographic strobe system 200.

In this example, each EESD bank 208, 212 includes a bank controller 252, 256 that controls the charging and discharging functionalities of the corresponding bank. For example, relative to discharge control each bank controller 252, 256 controls parameters such as rate of discharge, magnitude of discharge and length of discharge so as to produce the desired light output from strobe light 204 for that bank. For example, when light source(s) 216 include(s) one or more xenon electronic discharge tubes, each bank controller 252, 256 may include quench circuitry (not shown) for determining when to quench the discharge from the light sources, for example, when system 200 is providing a TTL pre-flash, a reduced-power image-capture flash (e.g., reduced by manual control or based on a TTL exposure calculation), etc. As those skilled in the art will understand, such quench circuitry can include a light integrator (e.g., phototransistor+a capacitor) and a comparator for determining when strobe light 204 has output the desired amount of light. When the quench circuitry has determined that strobe light 204 has output the desired amount of light, it may send a signal to the quench circuitry of the corresponding discharge circuitry 228, 232. Each bank controller 252, 256 may also include constant-discharge circuitry (not shown) for controlling the corresponding discharge circuitry 228, 232 in a manner that strobe light 204 provides the constant-level light output described above. In some embodiments, such constant-discharge circuitry can take a form similar to conventional FP-sync circuitry.

Photographic strobe system 200 also includes a system controller 260 and a communications system 264 for communicating with a user interface (not shown) that allows a user to view and/or set operating parameters that control the operation of the strobe system and/or display information to a user such as current settings and/or status(es) of one or more components of the system. In this example, communications system 264 also receives a fire signal, which is typically initially triggered by a camera in response to a photographer actuating a shutter-release control. Depending on the design of photographic strobe system 200, communications system 264 can be a wired system, a wireless system or a combined wired and wireless system that handles all communications from and to system 200. Examples of types of wireless communication that communications system 264 can use include radio-frequency, infrared light, visible light, etc.

In this example, system controller 260 controls the overall operation of photographic strobe system 200 and can be effectively executed as a software-controlled machine, such as microprocessor, application-specific integrated circuit, system on chip, etc., that operates under the control of suitable software 268, such as firmware, as those skilled in the art will readily appreciate. One function of system controller 260 is to implement user-provided settings for causing photographic strobe system 200 to operate according to those settings. Another function of system controller 260 is to trigger each of EESD banks 208, 212 in response to receiving a trigger signal that is ultimately initiated by a photographer, for example, via a shutter-release button on a camera. Depending on the configuration of system, another function of system controller 260 is to provide various information to a user, such as current settings and one or more statuses, such as ready conditions of EESD banks 208, 212. Other functions that may be performed by system controller 260, depending on the overall functionality of system 200, include providing control data to bank controllers 252, 256 for causing EESD banks 208, 212 to drive strobe light 204 in the desired manner, deciding which EESD bank(s) to use and/or in which order to achieve the desired light output from the strobe light and calculating parameters necessary for causing EESD banks to drive light source(s) 216 in the appropriate manner. FIGS. 8 to 13 illustrate exemplary intensity-versus-time curves and corresponding exemplary exposure periods for flash modes that photographic strobe system 200 of FIG. 2 can be configured and/or programmed to provide.

Figure 8:
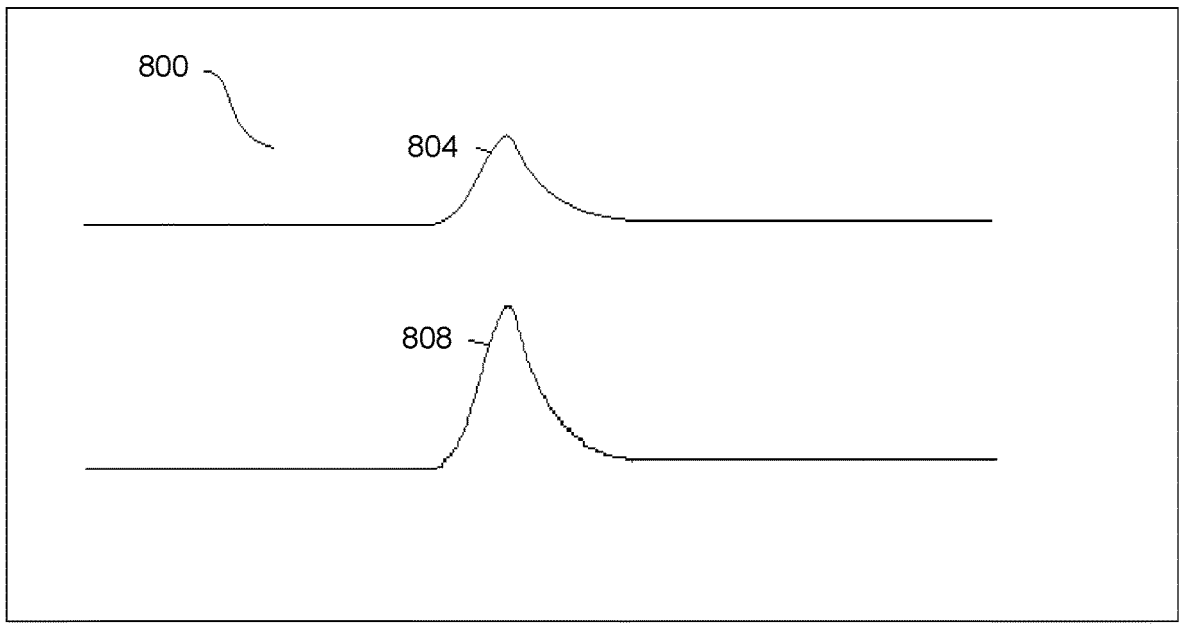
FIG. 8 is a graph of exemplary flash intensity-versus-time curves illustrating enhanced intensity image capture flashes that can be achieved with a photographic strobe system of the present disclosure.

Referring now to FIGS. 8 to 13, and also to FIGS. 2 and 3 to 7 occasionally as noted, FIG. 8 is an intensity-versus-time graph 800 illustrating an enhanced-intensity image-capture mode in which both EESD banks 208, 212 (FIG. 2) fire to provide more light than either one of the banks could provide alone. Assuming both EESD banks 208, 212 are identical (which they need not be), curve 804 illustrates the maximum intensity of light output by strobe light 204 powered by either of the EESD banks fired alone. Curve 808, however, illustrates the maximum intensity of light output by strobe lights 204 when EESD banks 208, 212 are fired simultaneously at maximum power. Here, the maximum intensity of curve 808 is essentially twice the maximum intensity of curve 804. In the context of strobe light 204 being a xenon gas discharge type light, curve 808 can be realized, for example, by providing two xenon-discharge-lamp light sources (not shown), each dedicated to a corresponding respective one of EESD banks 208, 212. Of course, either, or both, of EESD banks 208, 212 could be controlled to fire at less than full power, with the resulting light output being some value less than the power when both banks are fired simultaneously at full power.

Figure 9:
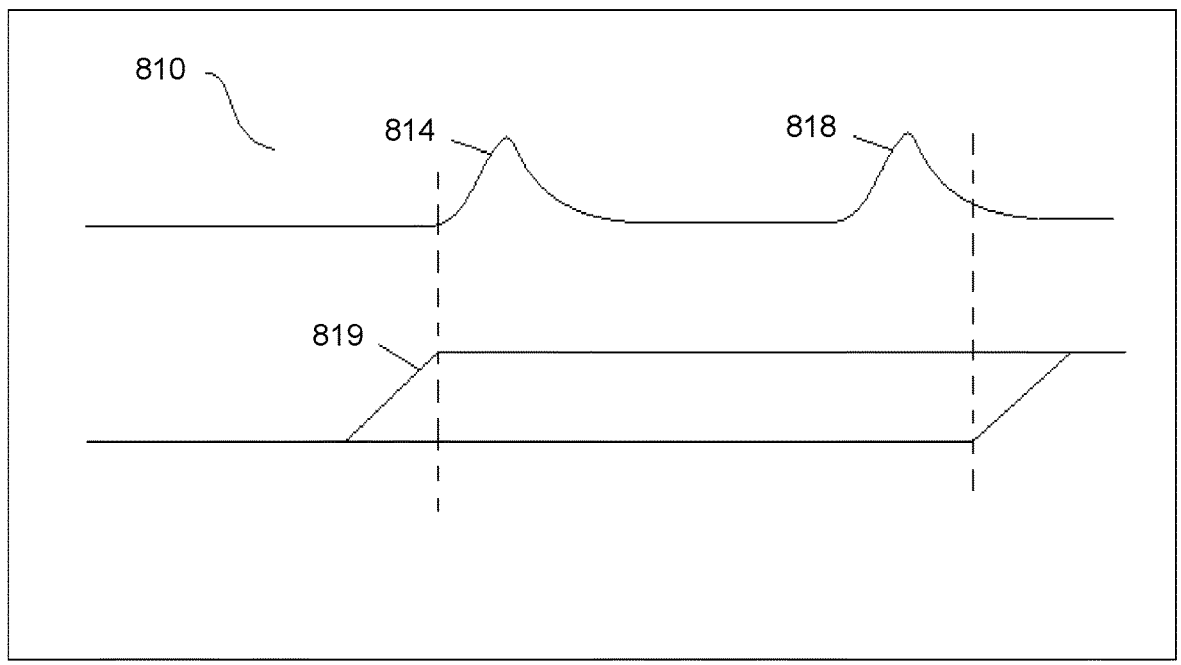
FIG. 9 is a graph of exemplary flash intensity-versus-time curves for a combined first- and second-curtain sync image-capture flash that can be achieved with a photographic strobe system of the present disclosure.
Figure 10:
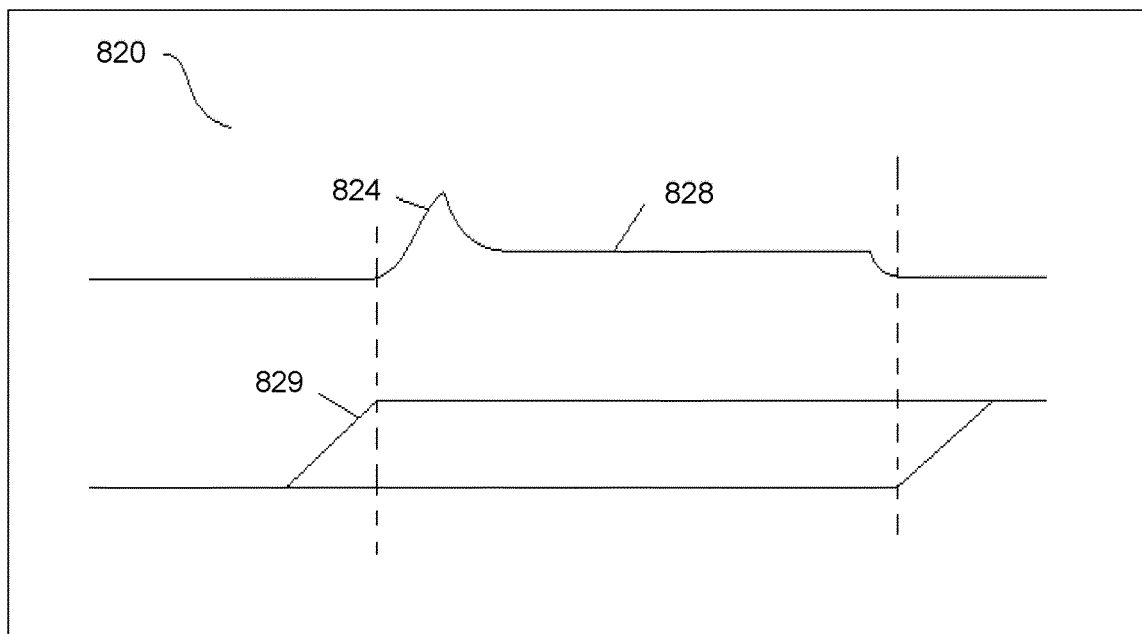
FIG. 10 is a graph of exemplary flash intensity-versus-time curves for a combined first-curtain sync plus constant-level image capture flash that can be achieved with a photographic strobe system of the present disclosure.

FIG. 9 is a graph 810 illustrating a first curtain plus second curtain image-capture mode in which system controller 260 (FIG. 2) fires one of EESD banks 208, 212 to provide a first-curtain image-capture flash (curve 814) and fires the other EESD bank to provide a second-curtain image-capture flash (curve 818). Plot 819 illustrates a first shutter (first curtain) movement and second shutter (second/rear curtain) movement such that flash 814 is positioned proximate the first shutter blade opening and the flash 818 is positioned proximate the second shutter blade closing movement. As those skilled in the art will readily appreciate, system controller 260 can be set so that the power at which one of EESD banks 208, 212 fires is independent from the power at which the other fires to give the photographer maximum control over the lighting conditions FIG. 10 is a graph 820 illustrating a first-curtain plus constant-level image-capture mode wherein system controller 260 (FIG. 2) fires one of EESD banks 208, 212 to provide a first-curtain image-capture flash (curve 824) and fires the other EESD bank to provide a constant-level flash (curve 828). Plot 829 illustrates a first shutter (first curtain) movement and second shutter (second/rear curtain) movement such that flash 824 is positioned proximate the first shutter blade opening movement and the constant-level light emission 828 is positioned proximate the second shutter blade closing movement. Those skilled in the art will readily appreciate that system controller 260 can be set so that the power of EESD banks 208, 212 are separately controllable.

Figure 11:
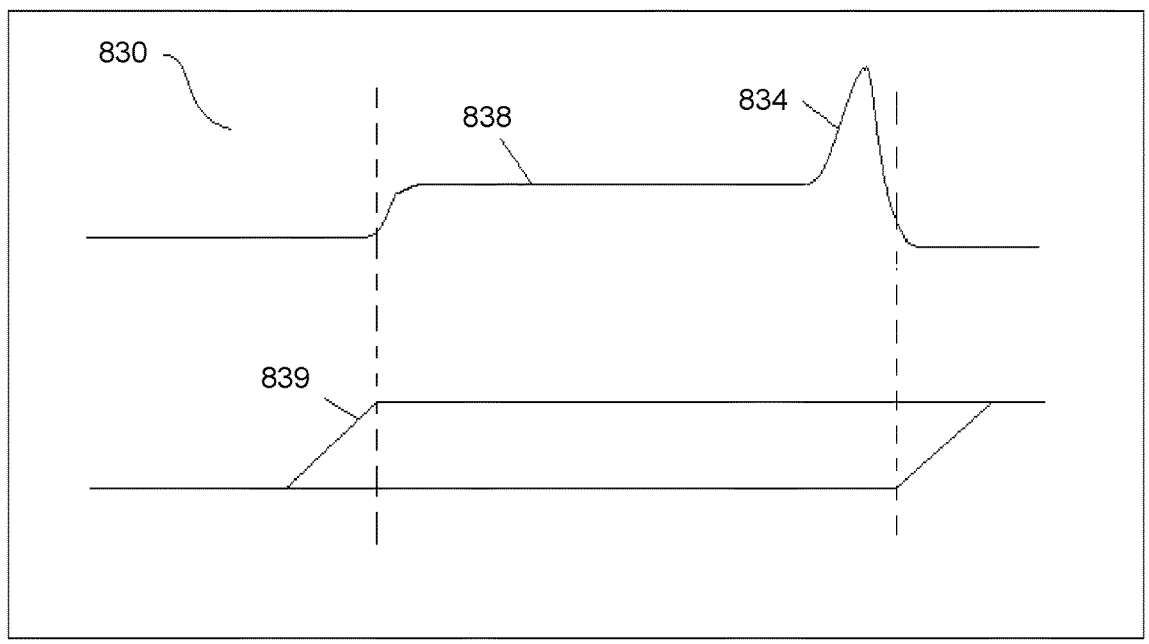
FIG. 11 is a graph of exemplary flash intensity-versus-time curves for a combined second-curtain sync plus constant-level image capture flash that can be achieved with a photographic strobe system of the present disclosure.

FIG. 11 is a graph 830 illustrating a second-curtain plus constant-level image-capture mode wherein system controller 260 (FIG. 2) fires one of EESD banks 208, 212 to provide a second-curtain image-capture flash (curve 834) and fires the other EESD bank to provide a constant-level flash (curve 838). Plot 839 illustrates a first shutter (first curtain) movement and second shutter (second/rear curtain) movement such that flash 834 is positioned proximate the second shutter blade opening movement and the constant-level light emission 838 is positioned proximate the first shutter blade closing movement. Those skilled in the art will readily appreciate that system controller 260 can be set so that the power of EESD banks 208, 212 are separately controllable.

Figure 12:
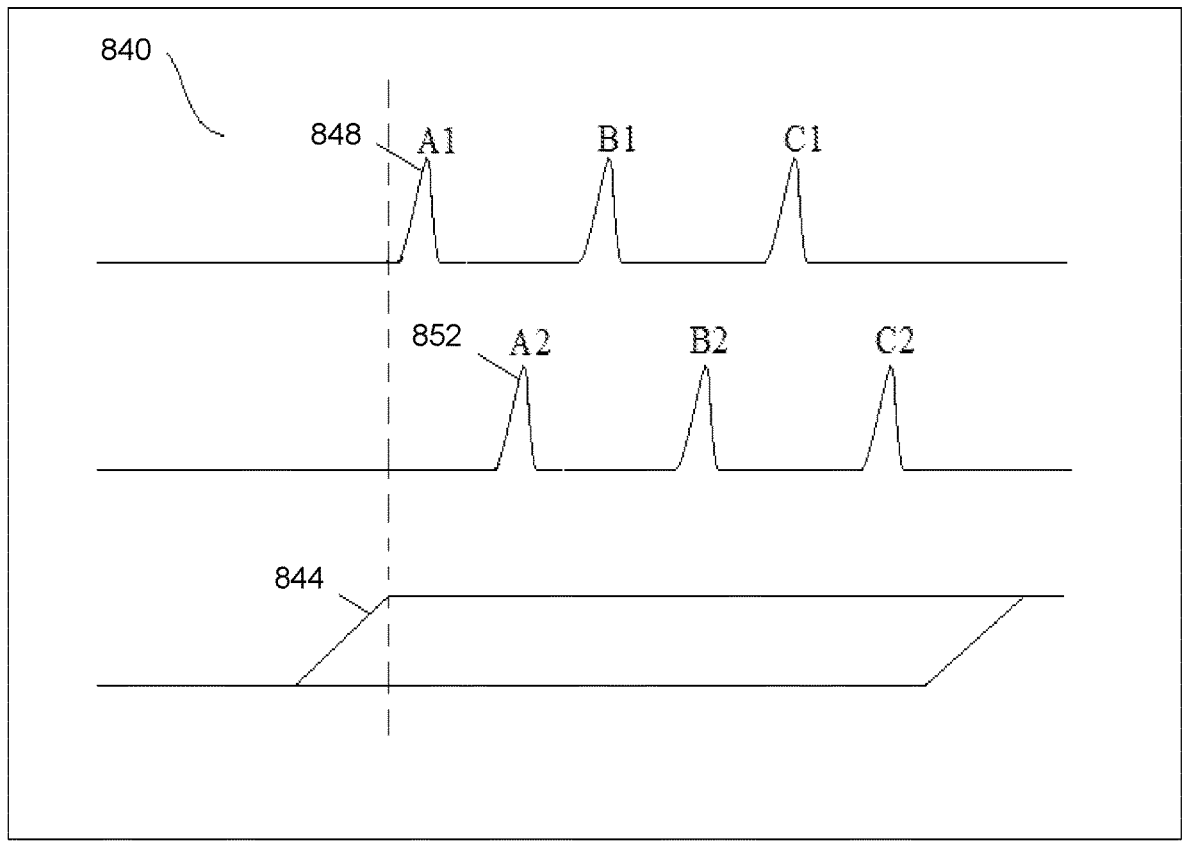
FIG. 12 is a graph of exemplary flash intensity-versus-time curves for multiple flashes strobed within a single exposure period that can be achieved with a photographic strobe system of the present disclosure.
Figure 13:
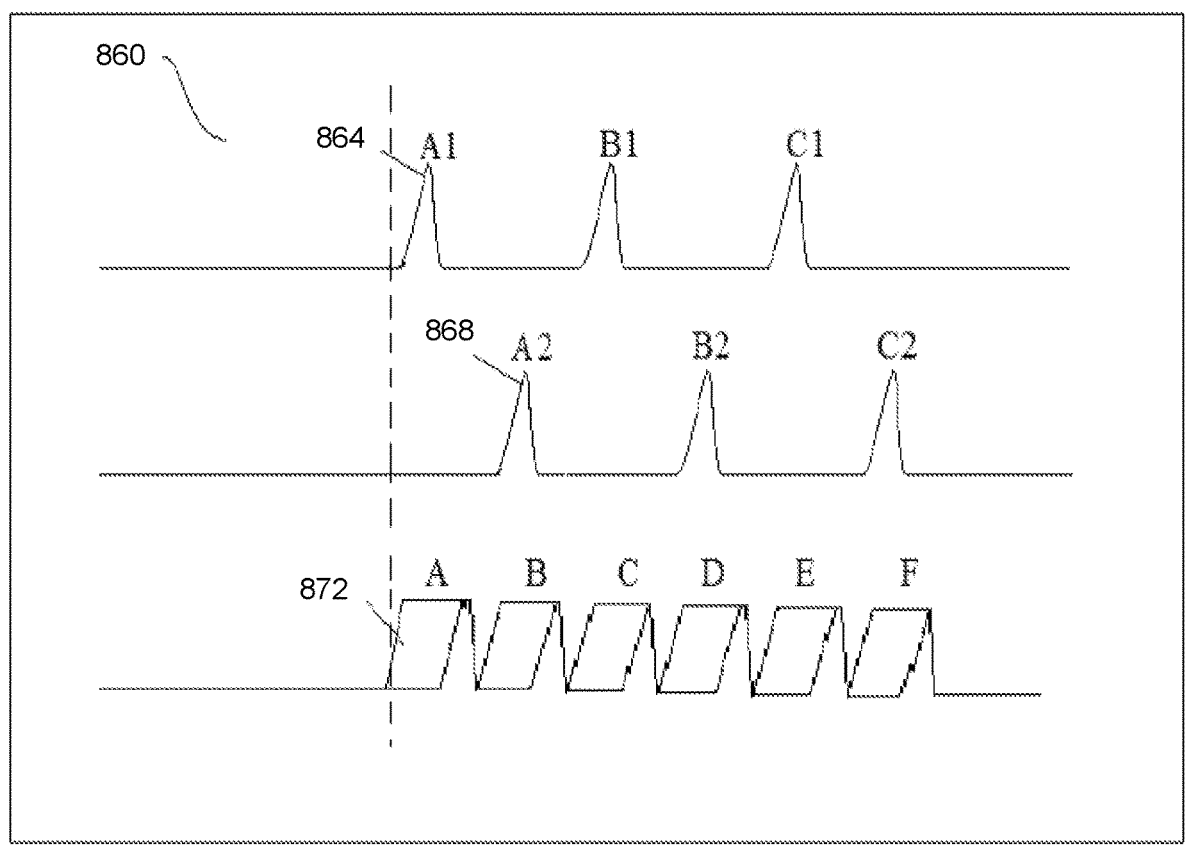
FIG. 13 is a graph of exemplary flash intensity-versus-time curves for multiple rapidly fired flashes for rapidly capturing sequential images that can be achieved with a photographic strobe system of the present disclosure.

FIG. 12 is a graph 840 that shows a single exposure period 844 (corresponding to the acquisition of a single image) during which multiple like-power flashes are fired at a certain frequency, F, which will be at a maximum when the flash is fired immediately following recharging. In FIG. 12, the flashes are created by system controller 260 (FIG. 2) alternatingly firing EESD banks 208, 212 so that each EESD bank fires at a frequency of F/2. This is represented in FIG. 13 by appending the curve identifiers with a "1" for EESD bank 208 and "2" for EESD bank 212. Consequently, flash-intensity-versus-time curves 848A1, 848B1, 848C1 are generated by firing EESD bank 208 and flash-intensity-versus-time curves 852A2, 852B2, 852C2 are generated by firing EESD bank 212. As those skilled in the art will appreciate, this alternating firing pattern allows for strobing strobe light 204 at a maximum frequency higher than the maximum frequency can be achieved with either of EESD banks 208, 212 standing alone. In the present case wherein there are two EESD banks 208, 212, the enhanced firing rate can be up to twice the firing rate of individual EESD banks. If more EESD banks are providing, the firing rate can be increased accordingly.

FIG. 13 is a graph 860 illustrating a rapid-fire, or burst, mode possible with a photographic strobe system made in accordance with the present disclosure, such as system 200 of FIG. 2. Graph 860 contains a series of flash-intensity-versus-time curves 864A1, 864B1, 864C1, 868A2, 868B2, 868C2 for like-power flashes fired at a constant frequency, much in the same manner as the flashes corresponding to flash-intensity-versus-time curves 848A1, 848B1, 848C1, 852A2, 852B2, 852C2 of FIG. 12. That is, curves 864A1, 864B1, 864C1 result from system controller 260 (FIG. 2) firing EESD bank 208, and curves 868A2, 868B2, 868C2 result from firing EESD bank 212. However, unlike FIG. 12, the flashes corresponding to flash-intensity-versus-time curves 864A1, 864B1, 864C1, 868A2, 868B2, 868C2 of FIG. 13 do not all occur within a single exposure period, but rather corresponding to respective exposure periods 872A-F for capturing a corresponding series of images (not shown). Like the flashes corresponding to curves 848A1, 848B1, 848C1, 852A2, 852B2, 852C2 of FIG. 12, because of the interleaving the flashes corresponding to curves 864A1, 864B1, 864C1, 868A2, 868B2, 868C2 of FIG. 13 can occur at a frequency higher than the maximum frequency possible with either of EESD banks 208, 212 used alone. As those skilled in the art will appreciate, while flash-intensity-versus-time curves 848A1, 848B1, 848C1, 852A2, 852B2, 852C2 of FIG. 13 and curves 864A1, 864B1, 864C1, 868A2, 868B2, 868C2 of FIG. 13 are shown as being of the same maximum intensity, in alternative embodiments the maximum intensities may vary in any manner desired, as long as system controller 260 and/or other components of photographic strobe system 200 are suitably configured.

It is noted that the foregoing modes just described are merely exemplary of operating modes that can be achieved with a multi-bank photographic strobe system of the present disclosure. The type of mode, the number of individual flashes that occur within a particular mode and other characteristics of a particular mode can vary, not only as a function of the configuration of each EESD bank, but also with the number of EESD banks provided. Those skilled in the art will surely be able to devise useful modes other than those shown. It is also noted that, if desired, the system controller of such a multi-bank photographic strobe system can be configured so that the system is able to operate in any one or more "single" flash modes, such as the modes illustrated in FIGS. 3 to 7 described above.

Figure 14:
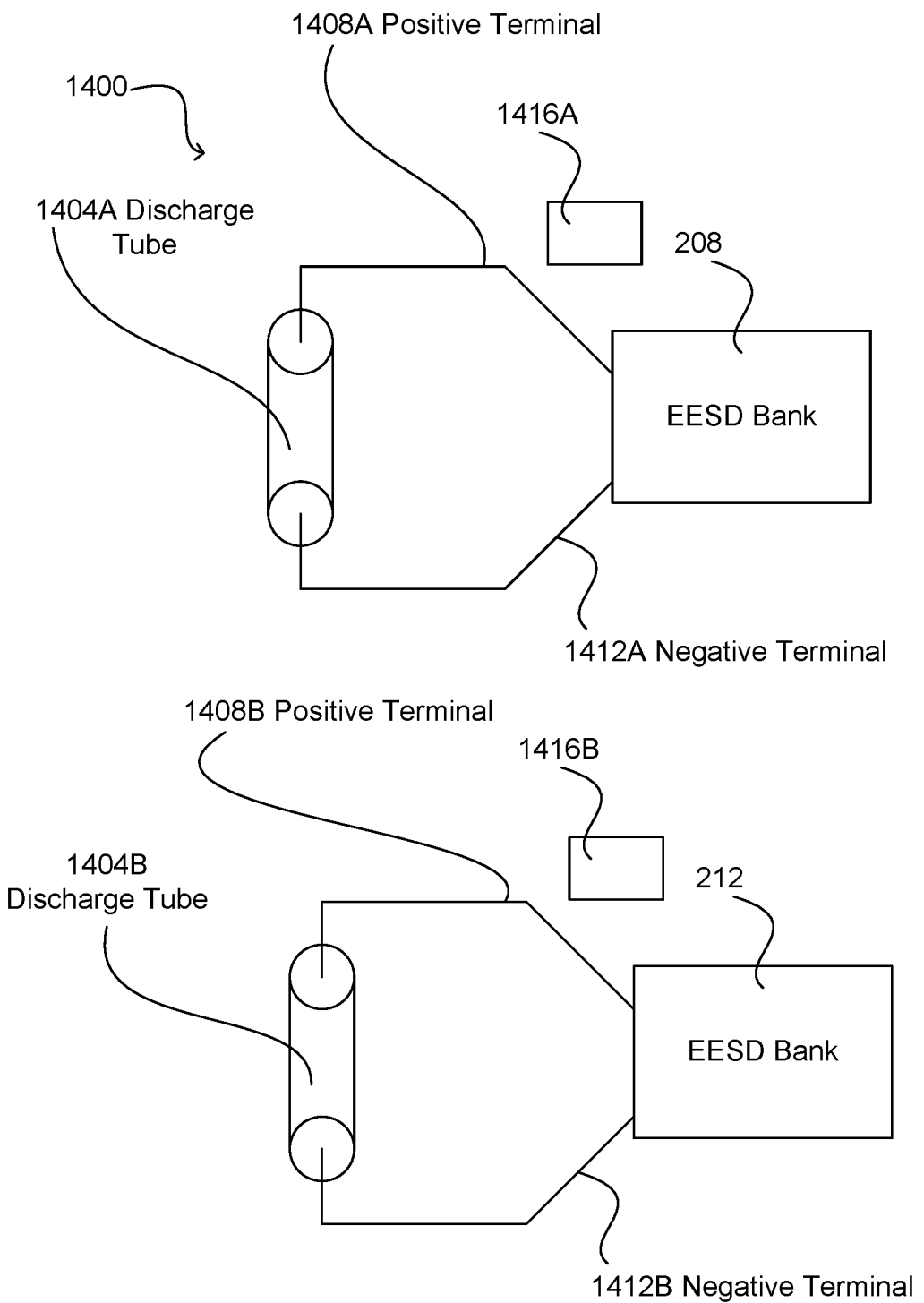
FIG. 14 is a schematic diagram of an exemplary strobe light having two light sources.

FIG. 14 illustrates a strobe light 1400 that can be used with, for example, a two-bank photographic strobe system, such as system 200 of FIG. 2. If used with system 200 of FIG. 2, strobe light 1400 of FIG. 14 would be strobe light 204 of FIG. 2. Referring to FIG. 14, strobe light 1400 is a gas-discharge-tube-type strobe light having a pair of gas-discharge tubes, in this example, like-sized xenon-discharge tubes 1404A-B. In the parlance of FIG. 2, above, discharge tubes 1404A-B would provide strobe light 204 with two light sources 216. Strobe light 1400 is configured so that discharge tube 1404A is electrically connected to, and driven by, only one EESD bank, such as EESD bank 208 of FIG. 2, and so that discharge tube 1404B is electrically connected to, and driven by, only another EESD bank, such as EESD bank 212 of FIG. 2. The electrical connections between each xenon discharge tube 1404A-B include connections that electrically connect a positive terminal 1408A-B, a negative terminal 1412A-B and a trigger 1416A-B on each tube to corresponding circuitry (not shown) within the respective bank to which that tube is electrically connected. As those skilled in the art will readily understand, such circuitry can include one or more high-voltage storage devices, a trigger transformer, quench circuitry and one or more switches. Those skilled in the art will also appreciate that alternative embodiments can have, for example, two or more gas-discharge tubes connected generally in parallel to the corresponding EESD banks, if desired.

Figure 15:
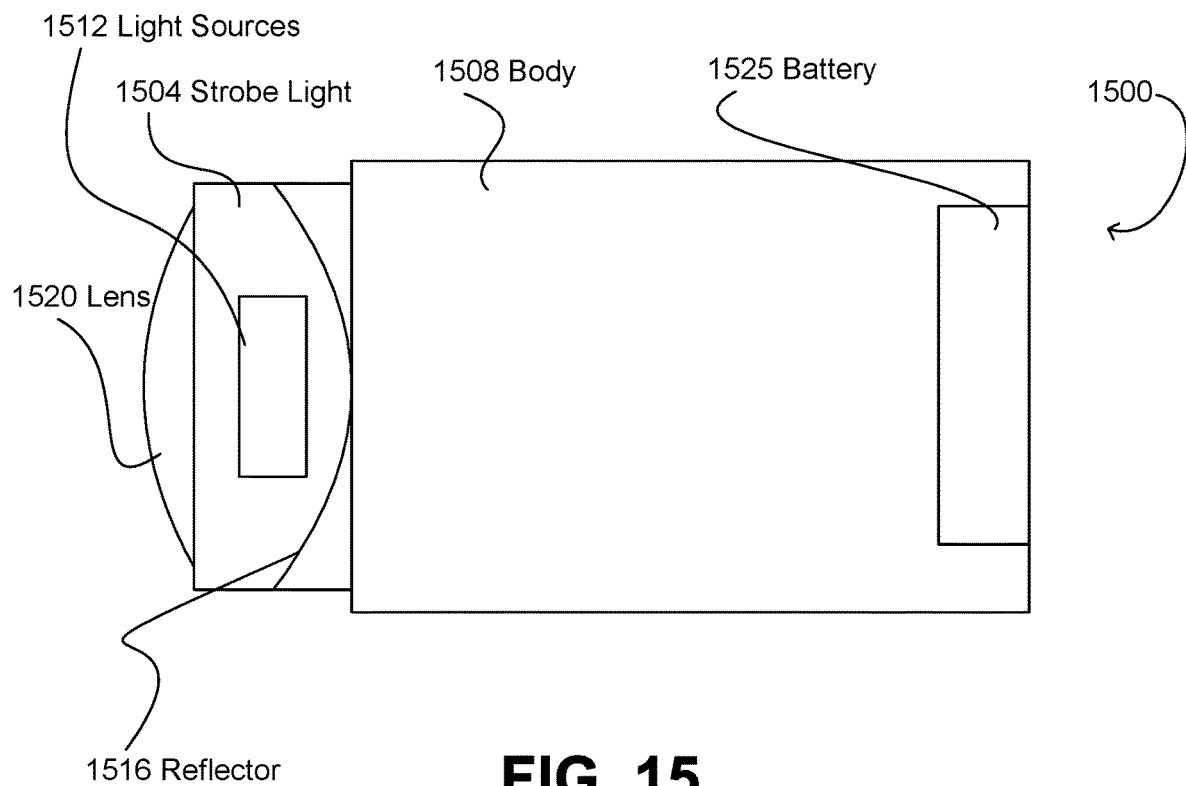
FIG. 15 is an isometric view of an exemplary photographic strobe device.
Figure 16:
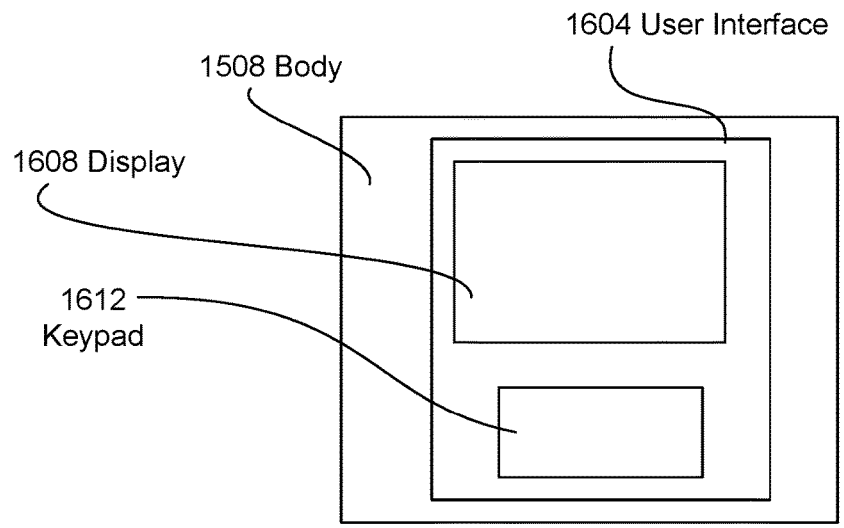
FIG. 16 is a rear elevational view of the photographic strobe device of FIG. 15.

FIGS. 15 and 16 illustrate photographic strobe device 1500 that incorporates at least some of a photographic strobe system of the present disclosure, such as system 200 of FIG. 2. Strobe device 1500 includes a strobe light 1504 and a body 1508 that houses onboard circuitry and electronics (not shown) that enable system 200 of FIG. 2. Body 1508 also houses an electrical energy storage battery 161525 16 for powering the onboard circuitry and electronics. A user interface 1604 (FIG. 16) is provided on the exterior of body 1508 for allowing a user to program and/or otherwise control device 1500 as desired. In this example, user interface 1604 includes an electronic display 1608 (LCD, OLED, etc.) and a keypad 1612. Display 1608 display information such as menus, settings, statuses, etc., and keypad 1612 allows a user to enter settings, request information, change menus, make selections, etc. In this embodiment, strobe light includes a pair of light sources 1512 (only one is visible, in FIG. 15), a reflector 1516 and lens 1520. Of course, many other photographic strobe devices may be made to include features of the present disclosure, such that those skilled in the art will readily understand that device 1500 of FIGS. 15 and 16 is merely exemplary. Skilled artisans will readily understand how to make and use many variations of devices using only the present disclosure as a guide.

Figure 17:
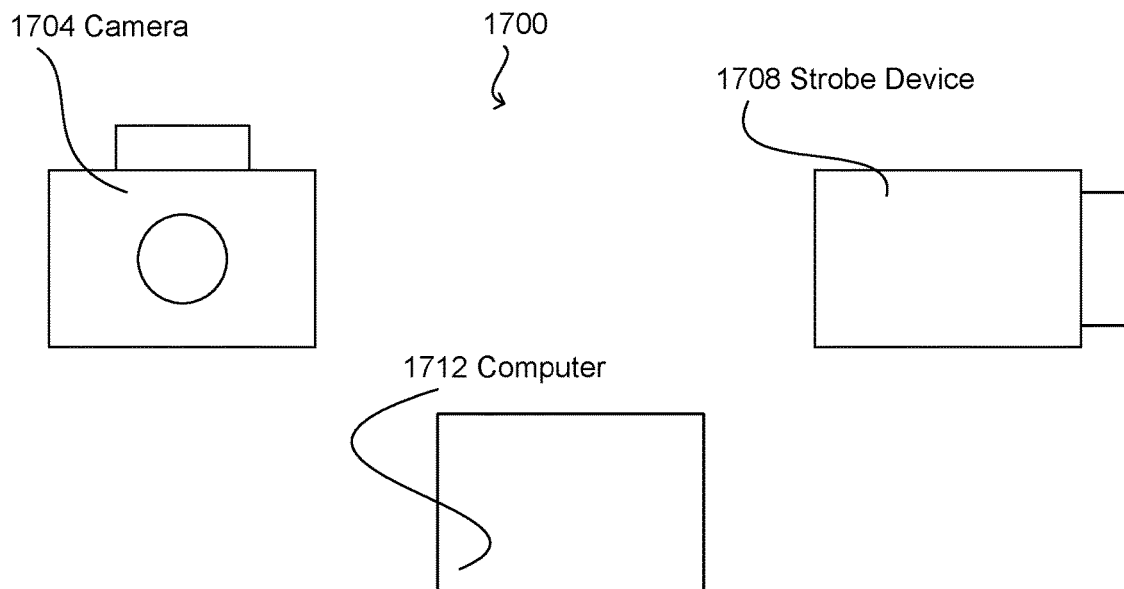
FIG. 17 is a diagrammatic view of an exemplary photographic system.
Figure 18:
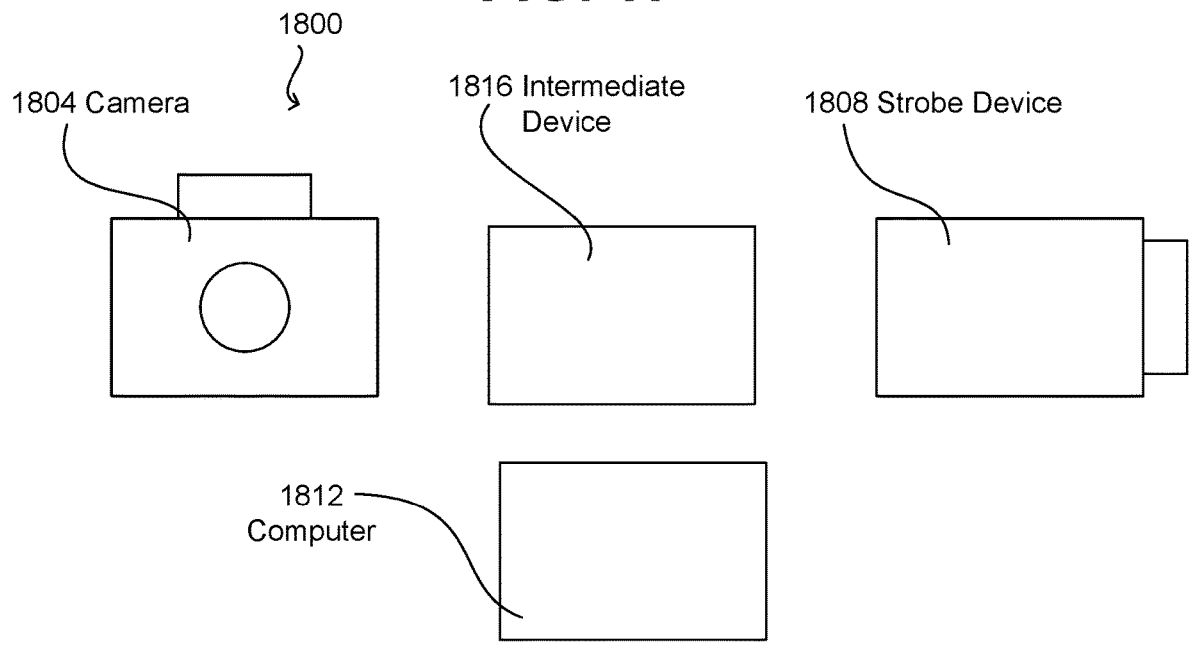
FIG. 18 is a diagrammatic view of another exemplary photographic system.

FIGS. 17 and 18 illustrate several examples of how a photographic strobe system made in accordance with the present disclosure, such as system 200 of FIG. 2, can be implemented in various photographic systems. Referring first to FIG. 17, this figure illustrates a camera system 1700 that includes a camera, such as a DSLR camera 1704 and a photographic strobe device 1708. Depending on the configuration of camera 1704 and/or strobe device 1708, camera system can also include an interface device, such as a laptop computer 1712. Laptop computer 1712 can be configured with appropriate hardware and software to provide a convenient user interface to system controller 260 (FIG. 2) and/or to camera 1704, for example, for settings various settings and operating parameters of those devices. Camera 1704 can be configured to communicate with each of strobe device 1708 and laptop either wirelessly (e.g., using one or more IEEE 802.15 and 802.11 communications protocols) or wiredly in a manner known in the art.

Referring to FIG. 17, and also FIG. 2, there are a number of ways that a photographic strobe system made in accordance with the present disclosure, such as system 200 of FIG. 2, can be implemented in camera system 1700 of FIG. 17. For example, strobe device 1708 can contain all of the components shown in photographic strobe system 200 of FIG. 2, such that communications system 264 receives directly from camera 1704 information for triggering the firing of strobe light 216 in the proper mode. Depending on the configuration of system controller 260 (FIG. 2), the information provided by camera 1704 can include a sync signal, camera exposure information, such as shutter speed, and/or information necessary for strobe device 1708 to fire in the proper mode, such as power setting(s), mode setting(s), duration setting(s), etc. In some embodiments, some of the information needed to properly configure system controller 260 of effecting a desired firing of strobe device can be set prior to firing using camera and/or the user interface for strobe device 1708 available on laptop computer, if any.

FIG. 18 illustrates a photographic system 1800 similar to photographic system 1700 of FIG. 17 except that system 1800 of FIG. 18 includes, in addition to camera 1804, strobe device 1808 and laptop computer 1812 (optional), an intermediate device 1816 that is configured to be an intermediary device between the camera and the strobe device. In this example, intermediate device 1816 acts to communicate, interpret and/or supplement information from camera 1804 for use by system controller 260 (FIG. 2) aboard strobe device 1808. Intermediate device 1816 may also include a user interface (not shown) for programming strobe device 1808 with the appropriate settings for providing desired operation during use. In one example, intermediate device 1816 is a photographic radio for controlling one or more aspects of communication between camera 1804 and strobe device 1808. In one such example, intermediate device is connected via a hotshoe connector of camera 1804. In another such example, intermediate device is internal to camera 1804. Intermediate device 1816 may include portions that are part of camera 1804, associated with camera 1804, connected to camera 1804, part of strobe device 1808, associated with strobe device 1808, connected to strobe device 1808, and/or any combinations thereof.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A photographic lighting device for use with a camera, the photographic lighting device including:
   one or more light sources;
   a plurality of EESD elements coupled to the one or more light sources;
   a control circuitry for causing a first light emission using a first one of the one or more light sources and one or more of the plurality of EESD elements and a second light emission using a second one of the one or more light sources and one or more of the plurality of EESD elements, the control circuitry configured to cause the first and second light emissions to occur during a single image acquisition window of an image acquisition by the camera, the image acquisition window starting when a first shutter blade of the camera starts movement and ending when a second shutter blade of the camera ends movement, wherein the first light emission is timed to be positioned at a first location in the image acquisition window and the second light emission is timed to be positioned at a second location in the image acquisition window such that the first and second locations are spaced apart by a time period that is about the same as a shutter speed exposure time for the image acquisition.

2. A photographic lighting device according to claim 1, wherein the control circuitry is further configured to cause one or more additional light emissions in the image acquisition window such that the first, second, and one or more additional light emissions are located in the image acquisition window with spacing between the light emissions being a time period of shutter speed exposure time/(N−1), where N is the number of light emissions.

3. A photographic lighting device according to claim 1, wherein the first one of the one or more light sources and the second one of the one or more light sources is the same light source.

4. A photographic lighting device according to claim 1, wherein the first and second locations are determined in relation to an energy balance point for each of the first and second light emissions.

5. A photographic lighting device according to claim 1, wherein the first and second locations are determined in relation to an energy balance point for each of the first and second light emissions, the energy balance point for each of the first and second light emissions occurring within the image acquisition window.

6. A photographic lighting device according to claim 1, wherein the first and second locations are approximately centered within the image acquisition window.

7. A photographic lighting device according to claim 1, wherein the first and second light emissions are symmetric light emissions.

8. A photographic lighting device according to claim 1, wherein the first and second light emissions are each a light emission type selected from the group consisting of a flash pulse, a near constant light emission, and a constant light emission.

9. A photographic lighting device according to claim 1, wherein the first light source and/or the second light source each include a light source selected from the group consisting of a gas discharge tube light source, an LED light source, an incandescent light source, and any combinations thereof.

10. A photographic lighting device according to claim 1, wherein the first light source and the second light source are in substantially similar optical path alignment.

11. A photographic lighting device according to claim 1, wherein the first light source and the second light source are each concentric ring light sources aligned one within the other.

12. A photographic lighting device according to claim 1, wherein the first light source and the second light source have substantially similar color temperature characteristics.

13. A photographic lighting device according to claim 1, further comprising an internal battery configured to provide power to the plurality of EESD banks.

14. A photographic lighting device according to claim 1, further comprising a wireless photographic radio for wirelessly receiving information from a remote camera for use by the control circuitry.

15. A photographic lighting device according to claim 14, wherein the wireless photographic radio is internal to the lighting device.

16. A method of operating a photographic lighting device in an image acquisition by a camera, the photographic lighting device including one or more light sources and a plurality of EESD elements, the method including:
causing a first light emission using a first one of the one or more light sources and one or more of the plurality of EESD elements, the first light emission occurring at a first location in an image acquisition window of the image acquisition by the camera, the image acquisition window starting when a first shutter blade of the camera starts movement and ending when a second shutter blade of the camera ends movement;
causing a second light emission using a second one of the one or more light sources and one or more of the plurality of EESD elements, the second light emission occurring at a second location in the image acquisition window of the same image acquisition as the first light emission, wherein the first light emission is timed to be positioned at a first location in the image acquisition window and the second light emission is timed to be positioned at a second location in the image acquisition window such that the first and second locations are spaced apart by a time period that is about the same as a shutter speed exposure time for the image acquisition.

17. A method according to claim 16, wherein the first and second locations are determined in relation to an energy balance point for each of the first and second light emissions.

18. A method according to claim 16, wherein the first and second locations are determined in relation to an energy balance point for each of the first and second light emissions, the energy balance point for each of the first and second light emissions occurring within the image acquisition window.

19. A method according to claim 16, wherein the first and second locations are approximately centered within the image acquisition window.

20. A method according to claim 16, wherein the first and second light emissions are symmetric light emissions.

21. A method according to claim 16, further comprising receiving from an intermediate device an information for use in the causing a first light emission and the causing a second light emission.

22. A method according to claim 21, wherein the receiving includes use of a wireless photographic radio that is internal to the photographic lighting device or external to the photographic lighting device, and the intermediate device is internal or external to a camera.

23. A system for photographic image acquisition comprising:
a camera configured for image acquisition; and
a photographic lighting device including:
one or more light sources;
a plurality of EESD elements coupled to the one or more light sources;
a control circuitry for causing a first light emission using a first one of the one or more light sources and one or more of the plurality of EESD elements and a second light emission using a second one of the one or more light sources and one or more of the plurality of EESD elements, the control circuitry configured to cause the first and second light emissions to occur during a single image acquisition window of an image acquisition by the camera, the image acquisition window starting when a first shutter blade of the camera starts movement and ending when a second shutter blade of the camera ends movement, wherein the first light emission is timed to be positioned at a first location in the image acquisition window and the second light emission is timed to be positioned at a second location in the image acquisition window such that the first and second locations are spaced apart by a time period that is about the same as a shutter speed exposure time for the image acquisition.

24. A system according to claim 23, further comprising a system controller configured to wirelessly communicate one or more commands from the camera to the photographic lighting device for causing the first and second light emissions.

* * * * *